United States Patent
Zhu et al.

(10) Patent No.: US 12,075,014 B2
(45) Date of Patent: Aug. 27, 2024

(54) DATA EMBEDDING AND DATA EXTRACTION IN IMAGE

(71) Applicant: Microsoft Technology Licensing, LLC, Redmond, WA (US)

(72) Inventors: Bin Zhu, Beijing (CN); Haidong Zhang, Beijing (CN); Yuanyuan Tang, Chaoyang District (CN); He Huang, Beijing (CN); Song Ge, Beijing (CN); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 17/615,087

(22) PCT Filed: May 3, 2020

(86) PCT No.: PCT/US2020/031239
§ 371 (c)(1),
(2) Date: Nov. 29, 2021

(87) PCT Pub. No.: WO2021/002923
PCT Pub. Date: Jan. 7, 2021

(65) Prior Publication Data
US 2022/0224801 A1    Jul. 14, 2022

(30) Foreign Application Priority Data

Jun. 30, 2019   (CN) .......................... 201910582121.4

(51) Int. Cl.
*H04N 1/32* (2006.01)
*G06T 7/194* (2017.01)
*G06T 11/20* (2006.01)

(52) U.S. Cl.
CPC ......... *H04N 1/32267* (2013.01); *G06T 7/194* (2017.01); *G06T 11/206* (2013.01); *H04N 1/3232* (2013.01); *H04N 1/32352* (2013.01)

(58) Field of Classification Search
CPC ............ H04N 1/32267; H04N 1/3232; H04N 1/32352; G06T 7/194; G06T 11/206
See application file for complete search history.

(56) References Cited

U.S. PATENT DOCUMENTS 6,181,706 B1 *  1/2001  Anderson ........... H04L 65/1101
                                                370/474
7,176,923 B2    2/2007  Vignet
(Continued)

FOREIGN PATENT DOCUMENTS

| CN | 1940966 A   | 4/2007 |
| CN | 101155249 A | 4/2008 |
| CN | 109919837 A | 6/2019 |

OTHER PUBLICATIONS

Savva, et al., "ReVision: Automated Classification, Analysis and Redesign of Chart Images", In Proceedings of the 24th Annual ACM Symposium on User Interface Software and Technology, Oct. 16, 2011, pp. 393-492.
(Continued)

*Primary Examiner* — Sing-Wai Wu
(74) *Attorney, Agent, or Firm* — Schwegman Lundberg & Woessner, P.A.

(57) ABSTRACT

According to implementations of the subject matter described herein, there is provided a solution for data embedding and data extraction in images. To perform data embedding, a target region for data embedding is determined from a source image, such as a chart image. Target data to be embedded is converted into a sequence of logical values represented in a predetermined format. Based on the sequence of logical values, image values of one or more
(Continued)

image elements in the target region are changed such that the changed image values in the target region can be used to convey the sequence of logical values corresponding to the target data. The variations in image values are within a predetermined range such that no significant data distortion of perception distortion is caused by the data embedding. In a subsequent process, the embedded data can also be easily extracted from the image for use.

12 Claims, 7 Drawing Sheets

(56) References Cited

U.S. PATENT DOCUMENTS

| | | | |
|---|---|---|---|
| 9,395,204 | B2 | 7/2016 | Albrecht |
| 9,396,567 | B2 | 7/2016 | Hiltz-Laforge et al. |
| 2007/0071279 | A1 | 3/2007 | Yamamoto |
| 2008/0080009 | A1 | 4/2008 | Masui et al. |

OTHER PUBLICATIONS

Balaji, et al., "Chart-Text: A Fully Automated Chart Image Descriptor", In Repository of arXiv:1812.10636, Dec. 27, 2018, 12 Pages.

Bridgwater, et al., "DataVR", Retrieved from: https://web.archive.org/web/20160120202518/https://devpost.com/software/datavr, Jan. 20, 2016, 5 Pages.

Gao, et al., "Reversible Data Hiding with Contrast Enhancement and Tamper Localization for Medical Images", In Journal of Information Sciences, vol. 385, Jan. 3, 2017, pp. 250-265.

Huang, et al., "Model-based Chart Image Recognition", In Proceedings of International Workshop on Graphics Recognition, Sep. 26, 2011, 12 Pages.

Jung, et al., "ChartSense: Interactive Data Extraction from Chart Images", In Proceedings of the CHI Conference on Human Factors in Computing Systems, May 6, 2017, pp. 6706-6717.

Kim, et al., "Automatic Contrast Enhancement using Reversible Data Hiding", In Proceedings of the IEEE International Workshop on Information Forensics and Security, Nov. 16, 2015, 5 Pages.

"International Search Report and Written Opinion Issued in PCT Application No. PCT/US20/031239", Mailed Date: Aug. 26, 2020, 14 Pages.

Qasim, et al., "ROI-Based Reversible Watermarking Scheme for Ensuring the Integrity and Authenticity of DICOM MR Images", In Journal of Multimedia Tools and Applications, vol. 78, Issue 12, Dec. 15, 2018, pp. 16433-16463.

"Information Technology—Automatic Identification and Data Capture Techniques—Bar Code Symbology—QR Code", In Journal of International Organization for Standardization, ISO/IEC, Jun. 2000, 2 Pages.

Kim, et al., "Ppt—(Updated) Automatic Contrast Enhancement Using Reversible Data Hiding", Jun. 2016, pp. 1-38.

Notice of First Office Action Received for Chinese Application No. 201910582121.4, mailed on May 27, 2024, 26 pages (English Translation Provided).

\* cited by examiner

DATA EMBEDDING AND DATA EXTRACTION IN IMAGE

CROSS-REFERENCE TO RELATED APPLICATION

This application is a U.S. National Stage Filing under 35 U.S.C. 371 of International Patent Application Serial No. PCT/US2020/031239, filed May 3, 2020, and published as WO 2021/002923 A1 on Jan. 7, 2021, which claims priority to Chinese Application No. 2019105282121.4, filed Jun. 30, 2019, which applications and publication are incorporated herein by reference in their entirety.

BACKGROUND

An image, upon creation, is mainly used to visually convey information. The information presented in the image can be visually and effectively perceived by humans, but it is usually difficult for machines to understand or recover the information conveyed in the image. For example, as one kind of graphical representation of data, a chart can be edited by a specific editing tool and converted as an image file for insertion into various types of documents, web pages, and other documents to visually present relevant data to the viewer. However, once presented in an image, the data is actually locked into pixel values of the image and is difficult to be accurately extracted by the machine for use in subsequent operations such as re-editing, enhancement, or redefining of the data, and the like.

SUMMARY

According to implementations of the subject matter described herein, there is provided a solution for data embedding and data extraction in images. To perform data embedding, a target region for data embedding is determined from a source image, such as a chart image. Target data to be embedded is converted into a sequence of logical values represented in a predetermined format. Based on the sequence of logical values, image values of one or more image elements in the target region are changed such that the changed image values in the target region can be used to convey the sequence of logical values corresponding to the target data. The variations in image values are within a predetermined range such that no significant distortion of visual perception is caused by the data embedding. In a subsequent process, the embedded data can also be easily extracted from the image for use.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION

Figure 1:
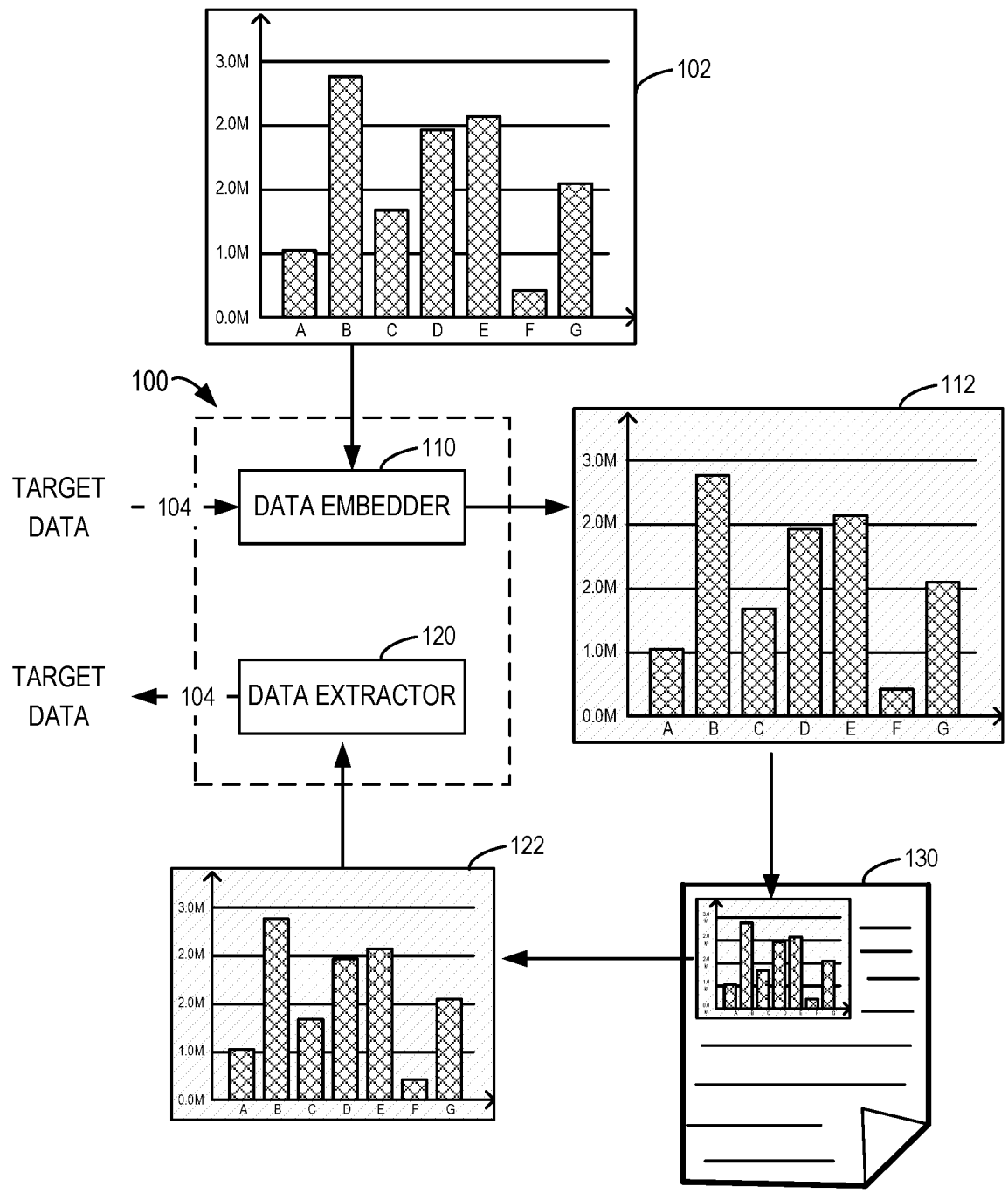
FIG. 1 illustrates a block diagram of an environment in which various implementations of the subject matter described herein can be implemented.

The subject matter described herein will now be discussed with reference to several example implementations. It is to be understood these implementations are discussed only for the purpose of enabling persons skilled in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be comprised below.

As mentioned above, it is difficult for machines to understand the information conveyed in a chart image and it is also difficult to extract accurately for use in subsequent editing and processing. In some images that present data such as values, text, etc., the data presented by an image is intended to be processed later. For example, quantitative data is often effectively presented to users in a visual manner such as a chart, and editing tools such as spreadsheets can be used to conveniently organize, in a variety of ways, quantified data into charts that are easy for people to understand. Charts may be made into chart images for distribution to media such as electronic documents, web pages, written files, and the like. However, it is difficult to for a machine to accurately understand or identify exact numerical information of data presented in the chart image.

In addition, as a separate file, an image may be propagated by various means such as transmission, copying, scaling, screenshots, printing, transforming formats, and shooting by an image capture device. In addition to the visually presented information in the image, it is difficult to pass other additional information in association with the image in the process described above without losing it, unless such additional information is presented in the image as a part of an image element.

In order to extract data from an image, in a conventional solution, the optical character recognition (OCR) and image recognition techniques are utilized to identify the chart type and visual code represented in an image or to obtain data represented virtually in the image. Although various researches have been made on the OCR and image recognition techniques, the result of data extraction is still not complete and accurate, and the error rate is high. Moreover, these techniques typically rely on the visual presentation of the image to extract data, so the resulting data should be visually presented on the image. Data which is not visually presented on the image cannot be obtained with the above method.

Example Environment and Basic Work Principle

FIG. 1 illustrates a block diagram of an environment 100 in which various implementations of the subject matter described herein can be implemented. In the environment 100, a data embedder 110 is configured to embed target data 104 into an image 102 to obtain an image 112 with data embedded. The image 102 may be referred to as a source image embedded with data and the image 112 may be referred to as a target image with data embedded. The target image 112 may be provided for various uses, for example, being inserted into an electronic document, a web page, being copied to other storage locations, being transferred to other devices, being printed, photographed, or re-edited, and the like. In the example of FIG. 1, it is schematically shown that the target image 112 is inserted into an electronic document 130 as an inset.

In the environment 100, a data extractor 120 is configured to extract the embedded target data 104 from an available image 122. The target data 104 extracted by the data extractor 120 may be provided for any subsequent processing. The image 122 may be referred to as a target image for data extraction. The image 122 may have undergone some candidate operations, and thus an image 112 output from the data embedder 110 may not be exactly the same as the image 122. For example, the image 122 may be obtained by screenshot from electronic document 130 and be scaled relative to the image 112. Of course, in some implementations, the image 122 processed by the data extractor 120 is exactly the same as the image 112 output by the data embedder 110.

The data embedder 110 and data extractor 120 may be integrated into a single computing device or system or may be distributed among different computing devices or systems. One or more functions of the data embedder 110 and the data extractor 120 may be used as a function library for data embedding and data extraction of images so that it can be called as needed. In some implementations, the data embedding of the data embedder 110 may be invoked by an editing tool of the image 102 or be integrated into an editing tool for integrating data into the edited image. For example, editing tools for editing charts and creating chart data, such as a spreadsheet application (e.g., an Excel application), and a business intelligence (Power BI) tool, can invoke the data embedder 110 to embed any expected data into the generated image. In some implementations, images obtained from various data sources may be provided to the data extractor 120 so as to attempt to extract the embedded data therefrom. The data extraction function of the data extractor 120 may be invoked by an application to which the image 122 is available or may be integrated into such an application, or the target data extracted by the data extractor 120 may be provided to such an application. An example of such an application tool may be an application for editing or creating an electronic document of an insertable image, such as a word processing application, a presentation document application, an image processing application, a spreadsheet application, and any other applications.

It should be appreciated that the various images and the applications for the images shown in FIG. 1 are merely examples. Any other type of images may also be applied for data embedding and data extraction, and the images embedded with data may be used for many other purposes.

According to implementations of the subject matter described herein, it is desired to embed data into an image without degrading the perceptual quality of the image and ensure that the embedded data can be accurately extracted. In order to better understand the solution of data embedding and data extraction proposed in various implementations of the subject matter described herein, some challenges or main requirements faced in embedding data into an image discovered by the inventors are briefly analyzed first. These challenges or requirements mainly involve robustness, data capacity, and perceived quality.

Typically, after embedded with data, an image may undergo various processing operations, such as compression, scaling, rotation, printing, recapture by an imaging device, and the like. These subsequent operations may cause further distortions of the image. Therefore, it is expected that the data embedding solution can be more robust to general processing and operational distortions that are probably encountered during the application of the image so that the embedded data can always be correctly extracted therefrom.

On the other hand, for a given image, the amount of data that can be embedded therein is limited. It is expected that the amount of data (also referred to as data capacity) embedded into the image is sufficient to embed all required data. The data capacity depends on the embedding solution used and specific parameters. In general, the robustness and the data capacity are two conflicting requirements. For a given embedding solution, if it is expected to increase the data capacity, the robustness will be decreased. In other words, it is difficult to maximize both the data capacity and the robustness at the same time in data embedding. In practical applications, there is a compromise between the two requirements. On option is to determine a regular degree of distortion in a target application scenario where an image embedded with data may be used and then set the robustness to a level that can withstand such distortion while maximizing capacity. Another option is to determine the amount of data to be embedded, that is, to set the required data capacity level, and then maximize the robustness under this condition.

When data is embedded into an image, particularly to an image having a visual presentation of chart data such as a chart image, it is desirable that the image embedded with data does not perturb a normal use of the image. This means that a high perceptual quality needs to be ensured for data embedding so that the visible perceptual distortion caused by the data embedding of the original image can be effectively controlled. Therefore, while ensuring that the embedded data can be correctly extracted, it is also desirable that the visible perceptual distortion is acceptable.

In the data embedding and extraction solution in accordance with implementations of the subject matter described herein, the requirements of one or more of the above aspects are taken into account. A solution for data embedding and data extraction of an image is proposed in accordance with implementations of the subject matter described herein. When data embedding is performed, target data is embedded into a target region in an image. To perform embedding, the target data is converted into a sequence of logical values. Depending on the logical values corresponding to the target data to be embedded, the image values of image elements of the target region are changed, and a degree of variation of the image values depends on a degree of impact on visual perception. Thus, the visual perception difference between presentations of the target region before and after embedding the target data is within a tolerable threshold.

The data embedded in the image can be accurately extracted. Specifically, to perform data extraction, a target region into which data may be embedded is determined from the image. A sequence of logical values represented in a predetermined format is determined based on image values of image elements in the target region, and then the sequence of logical values is converted into target data.

According to this solution, it is convenient to embed any expected data into an image without significantly affecting the perceptual quality of an image. In addition, the data in the image can also be easily extracted for subsequent use. In some implementations, such a data embedding and data extraction solution is particularly applicable for chart images with graphical representations of data. A target region is determined in a chart image, and target data is embedded into the target region.

Data embedding and data extraction in an image will be described in detail below with reference to FIGS. 2 to 8. Herein, for the purpose of illustration, data embedding and subsequent data extraction are described with reference to a chart image (e.g., a source image 102 shown in FIG. 1) as an example. Such chart images may be bar charts, line charts, dot patterns, any combination of the foregoing, or other types of charts. However, it should be appreciated that implementations of the subject matter described herein may be applied to any other image, such as computer generated graphics, line drawings, sketches, and the like.

Data Embedding

Figure 2:
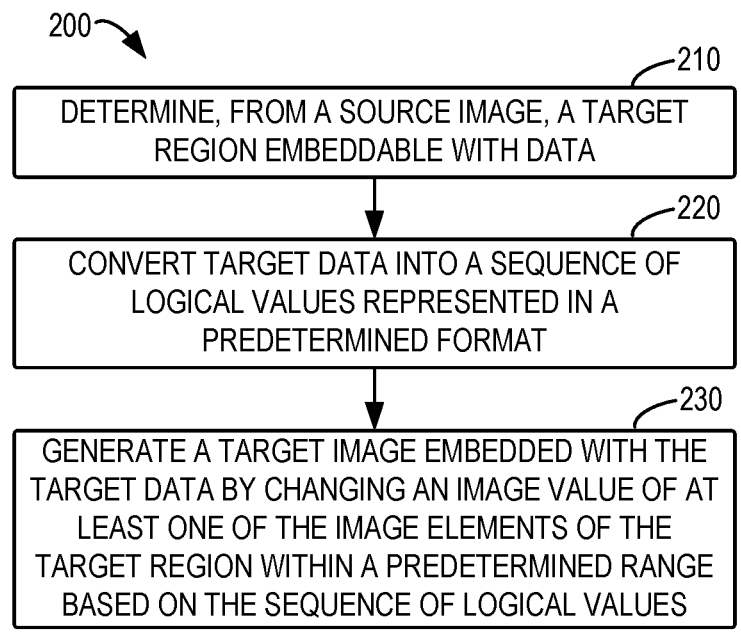
FIG. 2 illustrates a flowchart of a process for embedding data in images in accordance with an implementation of the subject matter described herein.

FIG. 2 illustrates a flowchart of a process 200 for embedding data into an image in accordance with an implementation of the subject matter described herein. For example, the process 200 may be implemented by the data embedder 110 of FIG. 1. For the purpose of discussion, the process 200 will be described with reference to FIG. 1.

At block 210, the data embedder 110 determines, from a source image (e.g., the source image 102 of FIG. 1) a target region embeddable with data. Typically, the source image 102 includes a plurality of image elements arranged in rows and columns. As used herein, the "image element" refers to a pixel of an image, a set of pixels, a super-pixel, a voxel, or other higher-level image components. Each image element has an associated value, referred to as an "image value", "pixel value", or "physical bit". With different image values of the image elements, the respective regions of the source image 102 can have different colors or tones to present respective visual information.

According to implementations of the subject matter described herein, in order to avoid a negative impact on the perceptual quality of an image by the data embedding, a target region embeddable with data determined in the source image 102 is composed of one or more relatively flat or textured areas. In an image, a flat area refers to an image region having a small fluctuation in image value, for example, a degree of variation of image values of a set of image elements in the flat area is within a predetermined threshold. The predetermined threshold for determining the flat area may be set to any suitable finite value, which is generally not too large. The setting of the predetermined threshold may be specifically set according to actual usage, and the predetermined threshold also depends on user tolerance on the visible perceptual distortion of the image. A textured area means that the image values in that region have a certain periodicity. The values of the image values in the flat and textured areas are usually predictable, facilitating data embedding and subsequent data extraction of the subject matter described herein.

A target region embeddable with data may include one or more consecutive sub-regions in the source image 102, each consecutive sub-region may be a flat area or a textured area. In some cases, the difference in image values for different sub-regions may be large. From a spectrum perspective, the spectral distribution of image values in each sub-region in the target region is relatively narrow, such as near DC. Visually, the color(s) presented visually by each of the consecutive sub-regions in the target region is not complex and variable, resulting in an overall smooth visual perception or a texture with periodic variation.

In some implementations, source images suitable for embedding data without causing a significant visual perception distortion include chart images, such as bar charts, line graphs, dot plots, and the like. The source images may also include graphics or images generated by a computer, lines or sketch images, and the like, which typically include at least one region with a small degree of variation of image values. It may be difficult to find such a target region in natural images captured by imaging devices.

In some implementations, the target region for embedding data may be the background region of the source image 102 rather than the foreground region. This is because when viewing an image, people may pay more attention to the information presented in the foreground region, so the possible visible perceptual distortion caused by embedding the image into the background region is easily overlooked by human eyes. In addition, background regions of most images typically include a relatively large monotonic area that may be used to embed data. Embedding the data into the background of the source image 102 can also improve robustness because the foreground regions of different images typically vary a lot. In an implementation based on a background region, the data embedder 110 may first separate the foreground region and the background region of the source image 102 and select a target region from the background region.

Various foreground and background segmentation techniques, which are currently available or to be developed in the future, may be employed to segment the foreground and background regions of the source image 102. In some implementations, the foreground and background regions are segmented by analyzing the distribution of image values in the source image 102 based on features in the foreground region that are more readily visible. More specifically, the pixel values in the source image 102 are clustered into a plurality of clusters. Based on the number of clusters, the image value distribution, and locations of pixel value in each cluster, as well as distances between individual clusters, it can be determined which clusters belong to the background cluster. The source image 102 may be segmented into a foreground region and a background region by the image values in the determined background clusters. In other implementations, the data embedder 110 is coupled to or integrated with an edit/generation tool of the source image 102 which knows the foreground and background regions of the source image 102, and can provide information on the foreground and background to the data embedder 110.

In one implementation, the entire background region of the source image 102 may be used to embed data because the background region typically does not have more color variations and the colors are more singular. For example, for a chart image, such as the source image 102 depicted in FIG. 1 as a bar chart, there are more basically white background regions in source images 102 other than foreground elements such as histogram regions, coordinate axes, annotations on coordinate axes, and numerical dimension lines. Such a background region may be used as a target region in which data is embedded.

In an alternative scenario, for example where the source image 102 can also be edited, in order to better achieve data embedding, the source image 102 may also be created such that the foreground and background regions can be better segmented. For example, a set of candidate background regions may be provided for selection when a user designs the source image 102. These background regions are significantly different from the visual representation in the foreground region and may have a relatively simple color or have a certain texture. This not only facilitates the perceptual quality of the generated source image 102, but also improves the perceptual quality of the target image obtained after data embedding.

In a further implementation, the target region may also be selected from the foreground region of the source image 102 as long as there are consecutive regions in the foreground region that have a smaller range of variations of image values. For example, in a source image with a limited background region, a target region may be selected to include a part of the foreground region and a part of the background region, or may be completely selected from the foreground region, as long as the distortion of the foreground region caused by the data embedding can be controlled within a range of user's visible perceptual distortions tolerance. For example, for a chart image, there is typically no background region or only a limited background region in an image of a pie chart type and thus a foreground region may be selected for data embedding.

Figure 3:
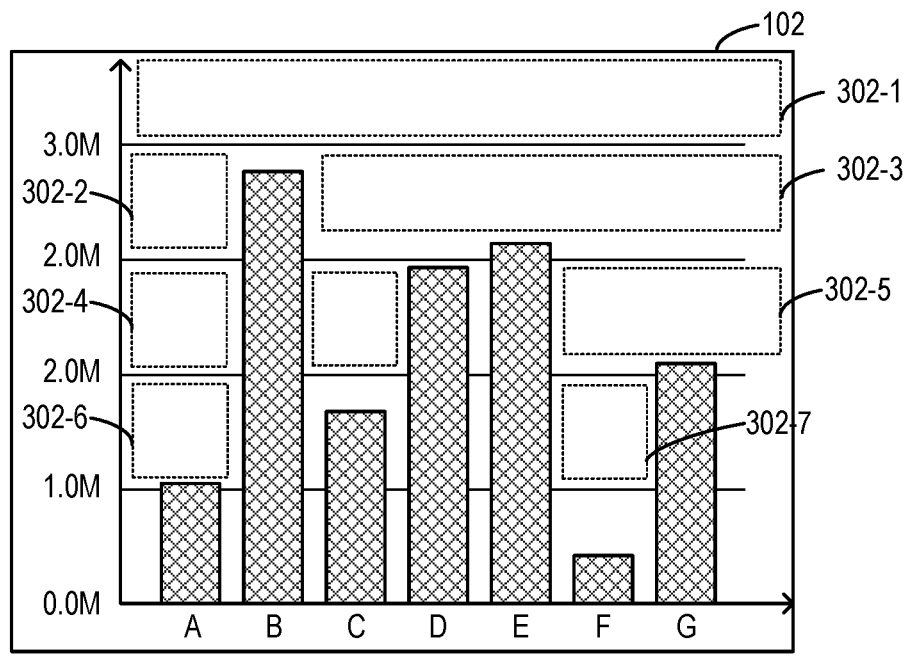
FIG. 3 illustrates an example of determining a target region embeddable with data from a source image in accordance with an implementation of the subject matter described herein.

In addition to the color requirement, the determined target region embeddable with data is of a certain size so as to carry the data to be embedded. A predetermined size threshold may be set. The data embedder 110 may determine whether there is a region in the source image 102 that is larger than the predetermined size threshold and the degree of variation of the image values is small. The data embedder 110 may determine one or more discrete sub-regions to be embedded from the source image 102. Each sub-region to be embedded is composed of a plurality of consecutive image elements, that is, a continuous area portion, where the size of each sub-region is larger than a predetermined size threshold. The data embedder 110 then determines if the total size of the plurality of sub-regions can enable the target data to be embedded. For example, as shown in FIG. 3, the data embedder 110 determines, from the background region of the source image 102, a plurality of sub-regions 302-1 to 302-7 (sometimes collectively or individually referred to as sub-regions 302 of the target region) as data embedding regions. In addition, the data embedder 110 also determines whether the total size of the plurality of sub-regions exceeds a predetermined size threshold. If the total size of the regions embeddable with data is large enough to embed with the target data 104, the data embedding operation can be performed subsequently.

The predetermined size threshold for the target region may be determined based on an amount of the target data to be embedded, or may be set as a reference value to ensure that a meaningful amount of data can be embedded into the source image 102. It should be appreciated that the predetermined size threshold may be set to any other size value, and the scope of the subject matter described herein is not limited in this regard.

Continuing to make reference to FIG. 2, the data embedder 110 converts, at block 220, target data (e.g., the target data 104) into a sequence of logical values represented in a predetermined format. The target data refers to data to be embedded in the source image 102. The target data may be any data, such as data related to a visual representation presented on the image, other auxiliary or enhanced data, or any other data that a user desires to embed, as long as the data capacity embeddable in the source image 102 allows for the embedding. In an example, for a chart image presenting a graphical representation of data, it may be desirable to embed the chart data so that the chart data can be subsequently retrieved from the image for purpose of viewing, re-editing, or other processing to be performed.

To achieve data embedding, the target data 104 is converted into a logical value representation in a predetermined format. The format of the logical value representation may be a binary format with two logical values of 0 and 1. Logical value representations in other bases, such as a quaternary representation, octal representation, and hexadecimal representation, are also possible. Such a format may enable the target data 104 to be represented by a finite number of logical values. The format of logical value representation selected will affect how the image values of the image elements are changed when the data is embedded. In the following implementations, for the purpose of illustration, the binary representation of the target data 104 will be described as an example. Logic values in other formats may be similarly applied in such implementations. In a binary representation, a logical value may also be referred to as a bit or a logical bit, and a sequence portion consisting of eight bits may be referred to as a byte. The sequence of binary logic values of the target data 104 may also be referred to as a bit sequence, a bit stream or a byte sequence.

In some implementations, to reduce the number of logical values used to represent the target data 104, data reduction may be performed on the target data 104. The data reduction may be referred to as a type of data compression, but it is more robust to error propagation. Therefore, errors or loss of certain data will not have much impact on subsequent data. This is different from general data compression techniques because the general data compression techniques may result in long dependencies between the compressed bit stream values, enabling all the subsequent data to be non-decodable in the event of data errors or data loss. In the implementations of applying the data reduction, a simple local conversion is performed on the original non-binary data in consideration of the error propagation of the data compression and the agnostic of the data itself.

For example, if the target data 104 includes an ASCII text, the highest bit in the binary representation corresponding to each ASCII character may be removed and then the remaining bits are byte-aligned. If necessary, after the byte alignment, if the last remaining bits are not sufficient to form a byte, padding bits may be added to form the last byte, thereby forming a sequence of logical values corresponding to the target data 104. In some examples, if the target data 104 includes a textual representation of the values, these values may be directly converted to a binary representation.

In some implementations, to alleviate the problem of limited embeddable data capacity in the source image 102, the target data 104 to be embedded may include a link, such as a uniform resource locator (URL) or other access links, for additional data, such that more relevant numbers can be accessed subsequently after the link is extracted. Alternatively, or in addition, the data embedding and extraction solution proposed in some implementations of the subject matter described herein may be used in combination with conventional solutions, such as OCR and/or image recognition techniques. In one example, the target data 104 to be embedded into the source image 102 may not include data that may be extracted from the visual presentation of an image using OCR and/or image recognition techniques. For example, for a chart image, if the source image 102 visually presents some numerical or related data, the data may not need to be embedded into the source image as the target data 104. In another example, the target data 104 to be embedded may include auxiliary information required in conventional OCR and/or image recognition techniques, which facilitate better identification of the data from the visual presentation of the image. For example, if a certain image recognition technology requires the type of the source image, the type of the source image may be embedded as the target data 104, which can improve the accuracy of subsequent image recognition. Of course, in such an example, when the OCR and/or image recognition techniques is/are used, it should be known that there is data embedded in the image to be processed, so as to avoid the influence of data embedding on a recognition result. The data embedding solution proposed in the implementations of the subject matter described herein is feasible because the data embedding in accordance with the subject matter described herein has a relatively small negative impact on the perceptual quality of an image visually.

At block 230, the data embedder 110 generates a target image (e.g., the target image 112 in FIG. 1) embedded with the target data 104 by changing an image value of at least one of the image elements of the target region within a predetermined range based on the sequence of logical values. According to implementations of the subject matter described herein, the target data 104 is conveyed by changing image values (e.g., pixel values) of image elements, where different image values are used to indicate different logical values. Each logical value in the sequence of logical values may be mapped to one or more image elements in the target region, and the logical values may be indicated by the image values of the image elements. The mapping of the sequence of logical values to the image values of image elements may be performed in order so as to facilitate extraction.

Specifically, for binary logic values, two different image values of an image element may be utilized to represent the two different logical values. In some implementations, the data embedder 110 may use an original image value of an image element to indicate one logical value (e.g., a logical value "0") and use a changed image value to indicate the other logical value (e.g., a logical value "1") by slightly changing an original image value of an image element. Alternatively, the correspondence between the image values and the logical values may also be configured in an opposite manner, for example, by using the original image value to indicate the logical value "1" and the changed image value to indicate the logical value "0." The change made to an original image value may be performed by increasing or decreasing the original image value by a certain amount and maintaining a difference between the changed image value and the original image value within a predetermined range, which ensures that a visual perception distortion introduced by the data embedding is not too large. In other implementations, the data embedder 110 may modify the original image values of the image elements to form two types of image values, one of which is used to indicate a logical value (e.g., a logical value "0"), and the other type of image value is used to indicate the other logical value (e.g., a logical value "1"). For logical values in other formats, such as the quaternary format, octal format, and the like, more different image values may be used to indicate respective logical values. In order to use the image values of the respective image elements to indicate the respective logical values, the image values of some image elements will be changed and such changes are also limited to a predetermined range to avoid causing a significant visible perceptual distortion.

The setting of the predetermined range may be determined based on a degree of impact on the visual perception, for example, set in such a way that the visual perception difference between presentations of the target region of the source image 102 before and after the data embedding is within a tolerable threshold. The predetermined range may be varied as needed because in different scenarios, different users and images may have different tolerances for the visible perceptual distortion, and thus the degrees of variation of image values used in the data embedding are determined based on different degrees of visual perception. As an example, if image values of the image elements of the source image 102 range from 0 to 255 and original image values of the image elements in the target region is approximately 255, the predetermined range may be set to 10 and thus the original image value of image elements may be modified to 245 to represent the other logical value.

Processing of Target Data During Data Embedding

To further improve the robustness of data embedding, in some implementations, the data embedder 110 divides the sequence of logical values of target data 104 into a plurality of packets or segments. In some implementations, the data embedder 110 may also add a prefix part to the sequence of logical values of the target data 104 and the prefix part includes one or more logical values represented in a predetermined format (e.g., a binary format) to indicate the length of the sequence of logical values of the target data 104. The sequence of logical values of the target data 104 is the data actually expected to be embedded, and thus may also be referred to as payload data, user data, or input data. The prefix part may include a predetermined number of logical values, for example, two bytes. The prefix part may indicate the length of the sequence of logical values of the target data 104 in units of bytes, for example, by using a prefix part of two bytes to indicate a logical sequence length of up to 65535 bytes. In other examples, the prefix part may include other numbers of logical values. In an implementation where a prefix part is included, the prefix part and the sequence of logical values are divided into a plurality of packets.

Figure 4:
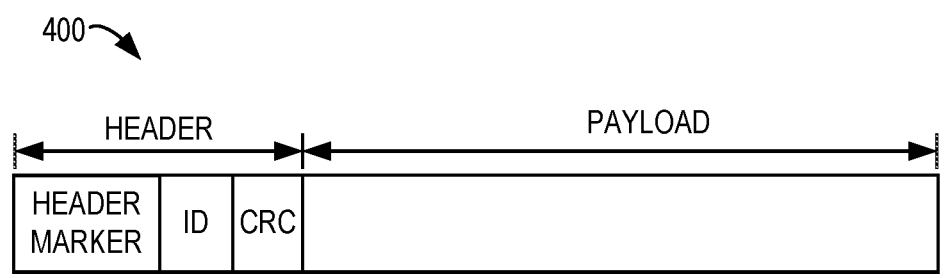
FIG. 4 illustrates an example packet of a sequence of logical values in accordance with an implementation of the subject matter described herein.

Each divided packet or segment includes a header part and a payload part. FIG. 4 shows an example of a packet 400 divided from a sequence of logical values, which is shown as including a header part and a payload part. The size of the packet, header part, and payload part may be pre-configured, and any number of logical values is possible. The payload part includes a predetermined number of logical values (which is sometimes referred to as a "third predetermined number" herein). In some cases, if the last divided packet does not have a sufficient number of logical values, padding bits may be added to fill the remaining space.

The header part includes one or more fields each including one or more logical values that are not from the sequence of logical values of the target data 104. The logical values in the header part may be configured to indicate a header marker (in a first field), an identification (ID) of the packet (in a second field), and/or a check code of the payload part, such as a cyclic redundancy check (CRC) code (in a third field), as shown in FIG. 4. The header marker in the header part is used to identify a header from a series of logical values. The ID of the packet is used to identify the current packet from all the packets. A plurality of packets divided from the sequence of logical values of the target data 104 or a sequence of logical values with the prefix part added may be sequentially numbered, and a corresponding number is indicated in the ID field of each packet. The CRC code may be determined based on the logical values of the payload part and/or the ID of the current packet. The CRC code may be used to detect if there is an error in the payload part and/or the ID of the packet.

In some implementations, the data embedder 110 may perform error correction coding to the logical values in the payload part to correct subsequent extraction errors. For example, a Reed-Solomon error correction algorithm may be utilized to perform the error correction coding to the payload, where the first portion of data in the payload part includes logical values from the sequence of logical values, and the second portion of data includes a parity check code for error correction of data of various fields in the packet, such as a combination of the ID, CRC code, and/or the logical values of the sequence of logical values in the packet.

By segmentation and adding parity information and/or error correction information, it is possible to limit possible errors within a single packet, avoid error propagation over a long sequence of logical values and also achieve error correction and data check within the packet.

In some implementations, a sequence of logical values of the target data 104 or a sequence of logical values having a prefix part may be packaged into a plurality of data blocks in a predetermined order and each data block includes a certain number of logical values placed in rows and columns. In an implementation in which the sequence of logical values of the target data 104 or the sequence of logical values having the prefix part are divided into packets, the data embedder 110 may package the divided packets into a plurality of data blocks sequentially and these data blocks carry other information except for the payload data. For example, in each data block, a sequence of logical values (with a prefix part) is organized into data blocks in an order from top to bottom and left to right. Of course, the data blocks are be arranged in other possible orders as long as such orders follow a certain pattern. The plurality of packaged data blocks are also embedded into the target region in a certain order to facilitate following cascading of logical values from the different data blocks.

The number of logical values in a data block is sometimes herein referred to as a "first predetermined number," which may be pre-configured. As will be understood below, each data block is embedded or mapped to one image block in the target region of the source image 102. In one aspect, the size of the data block (i.e., the number of logical values included) should not be configured to be too large in order to avoid leaving too many small image blocks that cannot be used to embed data in the target region. On the other hand, it is also desired to avoid configuring the size of a data block to be too small. As will be mentioned below, in addition to the payload data, the data block also includes one or more administrative logic values. If the size of the data block is too small, the ratio of the payload to configuration information in each data block is too small and the efficiency of carrying the payload data is too low.

Figure 5:
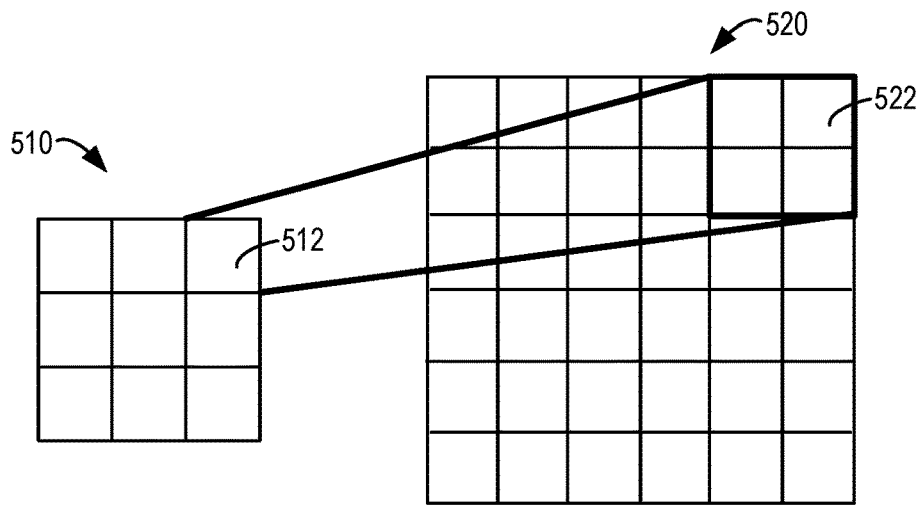
FIG. 5 illustrates an example correspondence from a logical value of a data block to image elements in accordance with an implementation of the subject matter described herein.

In one example, the size of the data block may be a data block of 3×3 bits, so each data block carries 9 bits (i.e., 9 logical values) and the 9 logical bits are arranged into the data block in 3 rows and 3 columns. FIG. 5 shows a 3×3 bits example data block 510 that includes 9 logical values arranged in rows and columns. However, it should be appreciated that FIG. 5 only gives a specific example, and each data block may be configured to other sizes, such as 4×4 bits, 5×5 bits, 3×4 bits, and the like.

A plurality of packets obtained by dividing a sequence of logical values may be packaged into a plurality of data blocks in order. Since these packets have respective identification, one packet may be distributed across a plurality of data blocks or one data block may include a plurality of packets depending on the size of the packets and the size of the data blocks. By sequentially placing the data blocks and through the identification of individual packets, a sequence of logical values of the target data 104 may be recovered in the data extraction, which will be seen below in the detailed description of data extraction.

The plurality of packaged data blocks may be embedded into a target region of the source image 102. Each of the logical values arranged in rows and columns in the data block corresponds to a predetermined number of image elements in the target region (sometimes referred to herein as the "second predetermined number") and thus the image values of the image elements may be used to indicate this logical value, for example, changing the image value within a predetermined range as described above to indicate a corresponding logical value. In some implementations, the second predetermined number is greater than 1; that is, each logical value may correspond to a plurality of image elements in the source image 102, which may enable the image embedded with the target data 104 to correctly convey the data even after the image is reduced. Higher robustness in image scaling can be obtained by using more image elements to indicate a single logical value. However, it should be appreciated that the embeddable data capacity will be correspondingly reduced by increasing the ratio between the logical value and the image value.

FIG. 5 illustrates embedding of a data block 510 into an image block 520 in a target region of the source image 102 during data embedding. The image block 520 includes a plurality of image elements 522. In the example of FIG. 5, one logical value 512 of the data block 510 is mapped to four image elements 522 of the image block 520. Such a ratio can ensure that an image embedded with data can be reduced to half of the original size in both directions while the correct data can still be decoded therefrom theoretically. FIG. 5 shows only one example, and other ratios are also possible. Each image element 522 in an image block may retain the original image value or be modified to other image values to convey a corresponding logical value.

In some implementations, in addition to the logical values from the target data 104, the data embedder 110 may also construct one or more data blocks to include one or more administrative logic values. An administrative logic value (referred to as the first administrative logic value) is used to indicate a correspondence between the logical values comprised in the data block and the image values of the image element. For example, if the original image value of the image elements is used to indicate a logical value "1" and the changed image value may be used to indicate a logical value "0", then the first administrative logic value takes a value of a particular logical value (e.g., the logic value "0"). If the correspondence between the logical value and the image value is reversed, the first administrative logic value is set as the other logical value (e.g., the logical value "1"). The correspondence between logical values and image values in a certain data block may need to be reversed in some cases. For example, if the logical values of a certain data block leads to a pattern of the corresponding image blocks that is difficult to distinguish this data block from other types of information blocks, as will be described below, then the correspondence between the logical values of this data block and the image values may be reversed.

In addition to the first administrative logic value or as an alternative, another administrative logic value (referred to as "the second administrative logic value") may be comprised in one or more data blocks for indicating the type of at least one data block to facilitate distinguishing it from other types of information blocks (described below). In the case of having two values (e.g., in the case of a binary representation), one value of the second administrative logic value may indicate that the current block is a data block and another value may indicate that the current block is not a data block.

In the implementation described above, the target data 104 to be embedded is organized into a plurality of data blocks in various ways and is embedded into the source image 102 in units of data blocks. In addition to the data blocks, other information blocks may also be designed to facilitate subsequent data extraction in a more convenient and accurate manner. In some implementations, the data embedder 110 may embed a start mark block and/or an end mark block in the target region for indicating the beginning and/or end of data embedding, respectively. For example, the target region embeddable with data in the source image 102 may be composed of a plurality of consecutive sub-regions, such as the plurality of sub-regions 302 shown in FIG. 3. In some implementations, the start mark block and the end mark block may be of the same size as the data block, and also include a plurality of logical values arranged in rows and columns, which may be set to a specific combination to indicate the start and end of data. The logical values of the start mark block and the end mark block may be indicated by the image values of the respective image elements in a similar manner, and the correspondence between the logical value and the image elements is the same as the logical value in the data block.

Figure 6A:
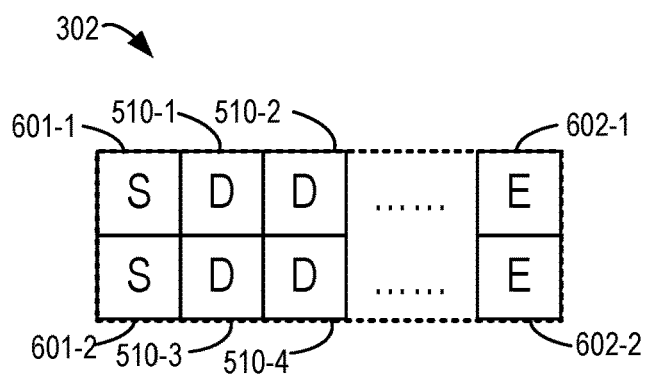
FIGS. 6A and 6B illustrate example arrangements of a start mark block, a data block, and an end mark block in a target region in accordance with an implementation of the subject matter described herein.

To facilitate subsequent data extraction, the data embedder 110 may embed a start mark block, at least one data block, and an end mark block in each consecutive sub-region. The start mark block is placed before the at least one data block, and the end mark block is placed after the at least one data block. In some implementations, a data embedder 110 may place a combination of a start mark block, data blocks, and an end mark block row by row or column by column in a row direction or column direction in a sub-region of the target region. FIG. 6A shows an example in which a start mark block, data blocks, and an end mark block are arranged in consecutive sub-regions 302 of a target region. As shown in FIG. 6A, on the first row of consecutive sub-regions 302, a start mark block 601-1 (represented by "S") is first placed, followed by a plurality of data blocks 510-1, 510-2 (represented by "D"), and the like, and finally the end mark block 602-1 (represented by "E") is placed. In the second row of consecutive sub-regions 302, in a similar manner, a start mark block 601-2 is placed, then a plurality of data blocks 510-3, 510-4, etc. are placed, and an end mark block 602-2 is finally placed.

In some implementations, the start mark block and the end mark block may be set to be identical, i.e., having the same size, and the values of the plurality of logical values are also the same so that the same pattern can be presented in the target region of the source image 102. In such an implementation, during data extraction, if a plurality of corresponding logical values are extracted from a certain image block, it may be determined from the context whether the extracted logical values indicate a start or end of the data. More specifically, if the left side of the image block from which these logical values are extracted is close to a non-target region (e.g., the foreground region) and the right side belongs to the target region (e.g., the background region), these logical values indicate the start of the data, and logical values extracted subsequently correspond to the target region. If the relative positioning relationship between the image block from which these logical values are extracted and the target region is opposite, it can be determined that these logical values indicate the end of the data.

Figure 6B:
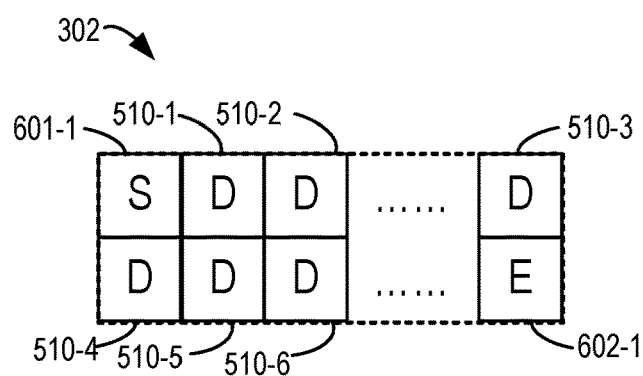

In some implementations, in addition to placing the start mark block, the data blocks, and the end mark block line by line or column by column, the data embedder 110 may also place the start mark block, the data blocks, and the end mark block in multiple rows or columns such that the start mark block and the end mark block mark the data blocks placed in an image region within a matrix range. As shown in FIG. 6B, in two rows of consecutive sub-region 302, the start mark block 601-1 is placed at the beginning of the first row, and the data blocks 510-1, 510-2, 510-3, etc. are placed in order on the first line until the end of the first line. Subsequent data blocks 510-4, 510-5, 510-6, etc. continue to be placed in the second row. An end mark block 602-1 is placed at the end of the second line to indicate the end of the data. The requirement for such a placement is that there is enough image space for embedding data blocks in the extended regions of both the start mark block and the end mark block in the row direction and the column direction; accordingly, the sub-region 302 is a rectangular region.

In some implementations, if the start and end of data embedding are marked by embedding the start mark block and the end mark block, the data block may not need to include the second administrative logic value mentioned above to indicate the type of the data block. This improves the embeddable data capacity while ensuring accuracy of data extraction.

In some implementations, if the sequence of logical values of the target data 104 or the sequence of logical values with the prefix part is all embedded into the target region of the source image 102 (and the start mark block, the end mark block, or the synchronization alignment block which will be described later is also embedded into the target region), at this time, there is still an embeddable area left in the target region, and then data embedding may be performed again from the beginning of the sequence of logical values. This process may continue until all available target regions have been embedded with data. In some implementations, other data may have been previously embedded into the source image 102, and when the target region is determined, the region in which the data is embedded may be avoided from being selected as the target region (if it is not desired to overwrite previously embedded data). In some implementations, if there are some small areas in the target region into which a data block or other preset information blocks cannot be embedded, logical values may be randomly embedded into this part of the area, as long as the pattern of the randomly embedded logical values is not the same as that of start mark block, the end mark block or the synchronization alignment block which will be described later.

Embedding of Synchronization Alignment Block

A target image with data embedded, for example, the target image 112, may be further processed in subsequent use, such as being scaled, printed, re-photographed, or subjected to other distortions and deformations, resulting in both the size and viewing angle of the image at the data extraction being different from those of the image 112 as produced by the data embedder 110, which may introduce errors in data extraction. In some implementations, to improve the robustness, when performing data embedding, the data embedder 110 also embeds one or more synchronization alignment blocks in the target region for image scaling and/or alignment in image extraction, thereby improving the accuracy of the data extraction result.

In one implementation, at least one coarse synchronization alignment block (sometimes referred to as a "first synchronization alignment block") may be embedded into the target region of the source image 102. The first synchronization alignment block has a first predetermined pattern. By embedding this predetermined pattern in the source image 102, the image to be extracted may be roughly aligned to the source image 102 (or the target image 112 embedded with data) in the data extraction. The first predetermined pattern may be designed to have a special structure and may be defined by changing image values of image elements in the target region. The definition of the first predetermined pattern in the target region may be defined by changing the image values of the image elements covered by the first synchronization alignment block within a predetermined range in a manner similar to the sequence of logical values. Different logical values correspond to different image values, so a particular pattern can be rendered by a combination of logical values.

Figure 7A:
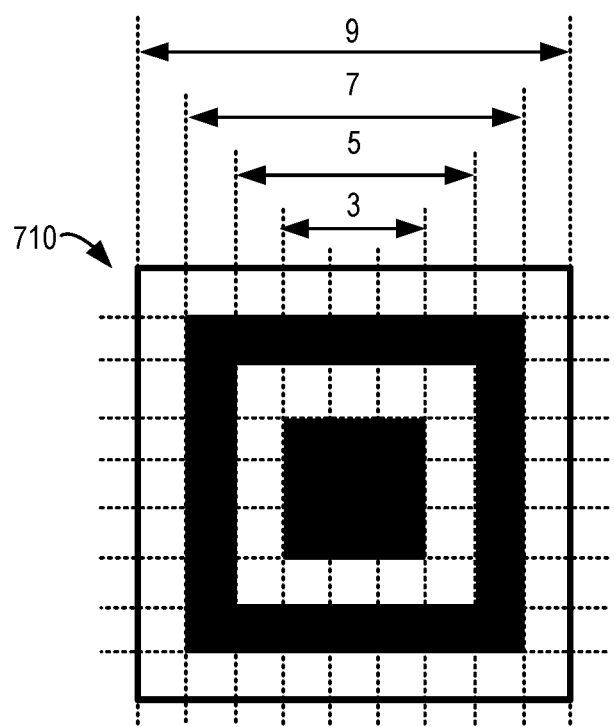
FIG. 7A shows an example of a pattern of a first synchronization alignment block in accordance with an implementation of the subject matter described herein.

FIG. 7A shows an example of the first synchronization alignment block 710. In this example, the first synchronization alignment block 710 has a structure of 9×9 bits, represented by 81 bits (logical values) arranged in rows and columns. In FIG. 7A, in order to show the pattern and structure of the first synchronization alignment block more clearly, the image values corresponding to the logical value "0" and the logical value "1" are illustrated with two significantly different colors, respectively, but it does not mean that the first synchronization alignment block has such a significantly visual presentation after being embedded into the source image 102. In the example of FIG. 7A, the first synchronization alignment block 710 includes a 3×3 bit structure at the center having a logical value "1" which may correspond to an image value for indicating the logical value "1" in the source image 102 (e.g., the changed image value in the background region), a square strip corresponding to the other logical value "0" (with a width of one bit) surrounding outside the 3×3 bit structure, a square strip corresponding to the flipped logical value "1" (with a width of one bit), and finally a square strip corresponding to the logical value "0" flipped again (with a width of one bit). Since the different logical values correspond to different image values, the first synchronization alignment block presents a corresponding pattern.

The mapping ratio and correspondence of each logical value in the first synchronization alignment block to the image block in the target region may be the same as those used in the embedding of the logical value of the target data 104. Of course, it is also feasible to indicate the pattern of the first synchronization alignment block in a different manner from the logical value of the target data 104. It should be appreciated that FIG. 7A shows only a specific example of the first synchronization alignment block. In other implementations, the first synchronization alignment block may be configured with any other pattern, shape, and size, and the scope of the subject matter described herein is not limited in this regard.

The first synchronization alignment block may be placed at any suitable location in the target region of the source image 102, and a plurality of first synchronization alignment blocks may be placed in the target region. In some implementations, a plurality of first synchronization alignment blocks may be placed at the edges of the target region for defining a bounding box of the target region, which requires the target region to have a continuous regular shape. In one implementation, the plurality of first synchronization alignment blocks may be placed in one or more consecutive sub-regions of the target region to define a bounding box of the sub-region. Thus, in the data extraction process, if the plurality of first synchronization alignment blocks is determined from the image, it is possible to quickly localize the target region from which data can be extracted. In some implementations described above, the embedded location of the data block carrying the target data 104 may be located by the start mark block and the end mark block, and the target region embedded with data may not need to be determined by the first synchronization alignment block. In this case, the first synchronization alignment block may be placed at any suitable location in the target region.

The first synchronization alignment block is used for coarse image alignment only. Since regions embeddable with data vary in different images, it may also be difficult to determine exact alignment and scaling of an image using a plurality of first synchronization alignment blocks. In some implementations, the data embedder 110 may also embed an additional fine synchronization alignment block(s) in the target region of the source image 102 for purpose of more accurate image alignment and scaling in the data extraction. Such a synchronization alignment block is referred to herein as the second synchronization alignment block. Each of the second synchronization alignment blocks has the second predetermined pattern, and the second predetermined pattern may also be designed to have a special structure, and may be defined by changing the image values of the image elements covered by the second synchronization alignment block within a predetermined range. To avoid confusion, the predetermined pattern of the second synchronization alignment block is different from the predetermined pattern of the first synchronization alignment block. Different logical values correspond to different image values, so a specific pattern can be rendered by a combination of logical values.

Figure 7B:
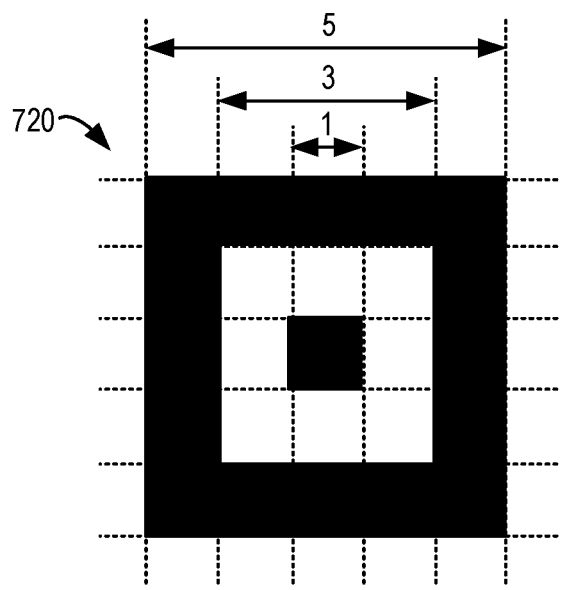
FIG. 7B illustrates an example of a pattern of a second synchronization alignment block in accordance with an implementation of the subject matter described herein.

FIG. 7B shows an example of the second synchronization alignment block 720. In this example, the second synchronization alignment block 720 has a 5×5 bit structure, represented by 25 bits (logical values) arranged in rows and columns. In FIG. 7B, in order to more clearly present the pattern and structure of the second synchronization alignment block, the image values corresponding to the logical value "0" and the logical value "1" are depicted by two significantly different colors, respectively, but it does not mean that the second synchronization alignment block has such a significantly visual presentation after being embedded in the source image 102. In the example of FIG. 7B, the second synchronization alignment block 720 includes a 1-bit structure at the center having a logical value "1" which may correspond to an image value for indicating the logical value "1" in the source image 102 (e.g., the changed image value in the background region), a square strip corresponding to the other logical value "0" (with a width of one bit) surrounding outside the center 1 bit structure, and then a square strip corresponding to the flipped logical value "1" (with a width of one bit). Since the different logical values correspond to different image values, the second synchronization alignment block presents a corresponding pattern.

A plurality of second synchronization alignment blocks may be embedded at any position in the target region of the source image 102. In some implementations, at least three second synchronization alignment blocks are embedded into the target region and they may all be placed anywhere in the target region, but their relative positioning satisfies a given condition such that their relative distances can be determined correctly after the data extractor 120 aligns and scales the image 122 with the first synchronization alignment block. If it is desired to improve robustness, more second synchronization alignment blocks may also be embedded. In some implementations, the second synchronization alignment blocks are embedded into the target region in pair, and the distance between every two of the plurality of second synchronization alignment blocks embedded in the row direction or the column direction is selected from a set of predetermined distances. In other words, the relative positions of the respective pairs of second synchronization alignment blocks are constrained by each other, and when being embedded into the source image 102, their distances are not arbitrarily determined but are selected from a limited set of candidate predetermined distances.

The predetermined distances are configured in such a way that after correcting (scaling and/or aligning) the image with the first synchronization alignment block(s), a maximum error of a distance between two second synchronization alignment blocks may be less than a half of a difference between two related distances among these predetermined distances. Thus, after correcting the image with the first synchronization alignment block, the actual distance between each pair of the detected synchronization alignment blocks can be determined and used to accurately determine the scaling and/or alignment parameters for scaling and/or aligning the image to be extracted with the source image 102 (as well as the target image 112). By the setting the distance(s) between the second synchronization alignment blocks, it is possible to solve the problem of how to accurately determine the scaling and/or alignment parameters after various possible subsequent operations.

In the implementations described above, in addition to performing corresponding processing on the sequence of logical values of the target data 104, some information blocks may be additionally embedded into the source image 102, including a start mark block, an end mark block, a coarse and/or fine synchronization alignment block(s), and the like. These information blocks (which may also be referred to as administrative blocks) can be used to improve the robustness of data embedding and extraction and to avoid data extraction errors caused by various distortions, scaling operations the image may be experienced during the image propagation.

In some implementations, since the administrative blocks are all configured with fixed logical values or fixed patterns, when different target data 104 are carried, certain data blocks may have same or similar logical values or patterns as one or more of the administrative blocks, making it difficult to correctly identify the administrative blocks. In this case, the correspondence between the logical values and the image values in the data block may be reversed to distinguish them from these administrative blocks. As discussed above, the first administrative logic value in a data block may be used to indicate whether the correspondence between the logical values and the image values in the data block is reversed.

In the data embedding process, after determining the target region of the source image 102, the data embedder 110 may first embed the first and/or second synchronization alignment blocks into the target region, and then may sequentially embed the start mark block and the end mark block in other parts of the target region (if needed) and embed a plurality of data blocks corresponding to the target data 104 after the start mark block and before the end mark block. In this way, the target image 112 is determined by the data embedder 110.

Further Processing on Source Image

In addition to embedding the target data 104 and the necessary administrative blocks, the data embedder 110 may perform further processing on the source image 102 to further improve the perceptual quality of the obtained target image 112 and to ensure accuracy of subsequent data extraction.

In some implementations, if a target region is to be selected from a background region of the source image 102, the data embedder 110 may select the target region such that there is a transition region between the edge of the target region and the edge of the foreground region. The transition region may be set to have a predetermined size, for example, having a predetermined width in the row direction and/or the column direction. The data embedder 110 may perform smoothing from the target region (i.e., the background region) to the foreground region for the transition region. This is because there may still be a certain degree of perceptible pattern after the target data 104 is embedded though drastically changing of the image values of the background region is avoided as much as possible. Typically, the visual elements (lines, shapes, objects, and the like) in the foreground region have some regular structures or patterns, such as vertical edges of each strip structure in a bar chart. If the visual pattern presented by the background region is connected with the foreground region after embedding the target data 104 into the background region, it may be easier for people to visually notice the background region because there is no significant difference between the background region and the foreground region.

In order to improve the perceptual quality of the target image 112 embedded with data, it may be desired to reduce the visibility of the background region relative to the foreground region. This effect can be achieved by setting the transition region. The transition region is not used to carry any data and the image values of the image elements therein may be adjusted to present a smooth transition from the edge of the background region to the edge of the foreground region. In some implementations, such a smooth transition needs to be avoided from being misunderstood as carrying any meaningful information, which can be achieved by adjusting the image values of the transition region based on the logical values of the target data 104 and the administrative blocks.

In some implementations, after embedded with the target data 104 in the background region, to further improve the perceptual quality, the data embedder 110 may further process one or more visual elements presented in the foreground region of the source image 110 to enhance visibility of the foreground visual element in the target image 112. The difference between the foreground region and the background region can be enhanced by increasing the visibility of the foreground region, which may not only improve the perceptual quality but also facilitate distinguishing the foreground region from the background region in the data extraction. The enhancement of the visibility of the foreground visual elements can be achieved by adjusting the image values of the image elements corresponding to the foreground visual elements such that the differences between the image values of the image elements corresponding to the foreground visual elements and those image values in the background region become larger. For example, after the visibility enhancement processing on the foreground region of the source image 102, the visibility of the numerical dimension line is enhanced in the obtained target image 112.

Data Extraction

Figure 8:
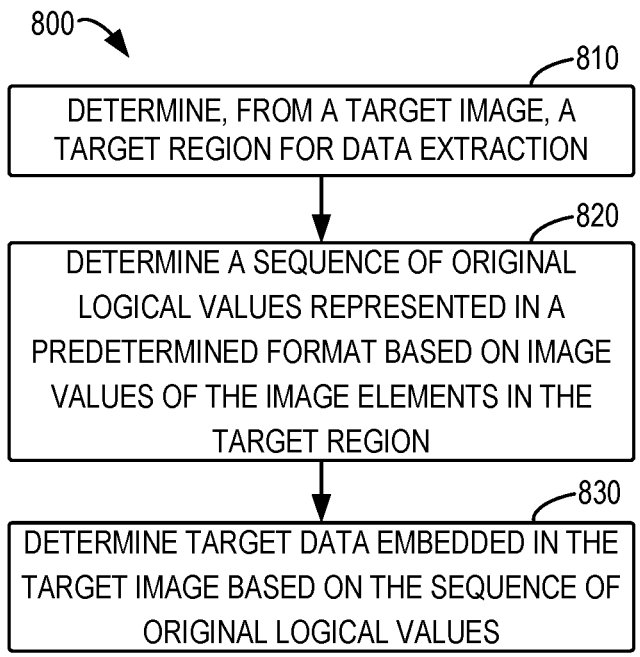
FIG. 8 shows a flowchart of a process for extracting data from an image in accordance with an implementation of the subject matter described herein.

The image 112 embedded with the target data may be used as a general image and may be further processed during subsequent use, such as being scaled, printed, re-photographed, or subjected to other distortions and deformation. Regardless of whether having any subsequent processing or not, both the image 112 embedded in the target data and a processed version may be used for extracting the data. The process of extracting data from an image is an inverse process of embedding the data into the image. FIG. 8 illustrates a flowchart of a process 800 for extracting data from an image in accordance with an implementation of the subject matter described herein. For example, the process 800 may be implemented by the data extractor 120 of FIG. 1. For the purpose of discussion, the process 800 will be described with reference to FIG. 1.

At block 810, a data extractor 120 determines, from a target image (e.g., the target image 122 of FIG. 1), a target region for data extraction. The target image 122 is a version of the target image 112 output by the data embedder 110 and the target image 122 may be identical to the target image 112, or may be subjected to any subsequent processing. The target region determined from the target image 122 is the identified region into which data may be embedded. Therefore, such a target region is usually also a flat or a textured area in the target image 122, where the degree of variation of the image values of the flat or textured area is relatively small.

In some implementations, if the background region in the image is selected as the target region for data embedding during the data embedding phase, then in the data extraction phase, the data extractor 120 may use various foreground and background division techniques that are currently in use or to be developed in the future to divide the foreground and background regions of the target image 122 and determine the target region from the background region. More specifically, the pixel values in the target image 122 are clustered into a plurality of clusters. Based on the number of clusters, the distribution of image values, and the location of each pixel value in each cluster, and the distance between individual clusters, it can be determined which cluster belongs to a background cluster. The target image 122 can be separated into a foreground region and a background region by using image values in the determined background cluster. It should be appreciated that various foreground and background segmentation techniques that have been or will be developed in the future may be utilized to segment the foreground and background regions of an image. In some implementations, the background region always serves as a candidate region carrying the target data.

At block 820, the data extractor 120 determines a sequence of original logical values represented in a predetermined format based on image values of image elements in the target region. Different image values of image elements in the target region respectively indicate different logical values in the predetermined format.

Without considering the possible image deformation (e.g., scaling or being re-captured at different angles, etc.) of the target image 122 after the data is embedded, the logical values corresponding to image values in the target region of the image 122 may be determined by scanning the target region (e.g., background region) line by line and column by column. A logical value may be determined based on a predetermined ratio of logical values to the image elements and a correspondence between logical values and image values during the data embedding. The predetermined ratio and the correspondence is commonly known or negotiated between the data extractor 120 and the data embedder 110. For example, if the predetermined ratio of the logical value to the image element is 1:4, the image values of the four image elements are used to represent one logical value. In some implementations, in order to implement more accurate data extraction, the target image 122 may be enlarged by a certain factor (e.g., doubled or tripled) and the sequence of original logical values is determined based on the enlarged target region.

In some cases, considering that the target image 122 embedded with data may have experienced image distortion, it is necessary to utilize some administrative blocks embedded in the target region to deform the target image 122 to align with the source image 102 or the target image 112. In some implementations, the data extractor 120 tries to find one or more first synchronization alignment blocks that may be embedded in the target region. Specifically, the data extractor 120 scans a first candidate pattern matching the structural feature of the first predetermined pattern row by row and column by column in the target region based on the first predetermined pattern of the first synchronization alignment block. For example, by means of row-by-row and column-by-column scanning, it is to find whether there is a region with a distance ratio of 1:1:1:3:1:1:1 in the row direction and the column direction in the target region (corresponding to the first predetermined pattern shown in FIG. 7A). A candidate image block may be formed by combining corresponding regions in the row direction and the column direction. For each candidate image block, the data extractor 120 checks the structural continuity to determine if a pattern of the candidate image block matches the first predetermined pattern, so as to obtain the first candidate synchronization alignment block. In some examples, there may be a plurality of first candidate synchronization alignment blocks.

After determining the first candidate synchronization alignment block, the data extractor 120 determines the deformation parameter with which the first candidate pattern of the first candidate synchronization alignment block is deformed to the first predetermined pattern, that is, how to perform deformation on the first candidate pattern to make the first candidate pattern become similar to the first predetermined pattern (note that since there is no distance reference in a row direction and a column direction, it may not be possible to accurately determine the scaling from the first candidate pattern to the first predetermined pattern in size). In some implementations, if there is a plurality of first candidate synchronization alignment blocks, a plurality of deformation parameters may be determined. Then, based on the mean and standard deviation of the plurality of deformation parameters, the candidate synchronization alignment blocks with a relatively large difference in the distribution mean of a probability distribution model (such as a Gaussian distribution) composed of the mean and the standard deviation is excluded from the plurality of first candidate synchronization alignment blocks. The mean or median of the deformation parameters corresponding to the candidate synchronization alignment blocks that are not excluded may be determined as the deformation parameter for performing deformation on the target image 122. A coarse deformation may be performed on the target image 122 by the deformation parameter, and in particular, the alignment of the target image 122 can be corrected.

In some implementations, based on a similar process, a plurality of second candidate synchronization alignment blocks may be determined from a target region in which a target image 122 is corrected by the first candidate synchronization alignment block, where the second candidate synchronization alignment blocks have the second candidate pattern matching the structural features of the second predetermined pattern. Determining a more precise scaling parameter for the target image 122 (i.e., the deformed target image) based on the candidate distance of each two adjacent ones of the plurality of candidate synchronization alignment blocks in a row direction and the previously known distance the second synchronization alignment block may be allowed to set.

Parameters of the alignment and scaling operations that need to be performed on the target image 122 may be determined by looking up the first and second synchronization alignment blocks and based on the predetermined pattern and predetermined distance of the synchronization alignment blocks. Thus, the target image 122 is substantially identical to the target image 112 in size and viewing angle after the deformation and scaling. Data extraction can be performed more accurately based on the target image 122 calibrated by deformation and scaling. In some implementations, the target image 122 may also be further enlarged (e.g., doubled or tripled). As mentioned above, this can further improve the accuracy of the deformation and scaling calibration and the accuracy of data extraction.

After deformation and scaling calibration or in the case where it is determined that no deformation and scaling calibration is required, the target region determined from the corresponding image may be used to extract the sequence of original logical values. The sequence of logical values may be similarly extracted in order from the target region in consideration of the logical value embedding manner of the target data at the time of data embedding. In some implementations, the data extractor 110 first detects a start mark block from the target region, and in particular detects a start mark block from a consecutive sub-region consisting of a plurality of image elements. The combination of the plurality of logical values used to compose the start mark block is predetermined, so that the most matching image block portion may also be searched from the target region using the matching method similarly. After locating the start mark block, one or more data blocks for transferring the target data are detected starting after the start mark block.

Alternatively, or in addition, the data extractor 110 may also detect an end mark block in the target region, particularly in consecutive sub-regions. The combination of the plurality of logical values used to compose the end mark block is predetermined, and as mentioned above, the combination may be the same as the combination of the plurality of logical values that compose the start mark block in some examples. After detecting the end mark block, data extractor 110 may determine one or more data blocks between the start mark block and the end mark block. In some implementations, in addition to the synchronous alignment block, mapping between the detected start mark block and the real start mark block, and/or the detected end mark block and the real end mark block may also be used to fine tune the position of the current block in the target image 122 deformed and scaled to correct the cumulative error caused by the data extraction process.

When determining each of the logical values in the sequence of original logical values, the specific value may be determined based on the degree of variation of image values of the corresponding one or more image elements relative to the original image values in the target region of the target image 122. In some implementations, the logical values comprised in the plurality of data blocks determined in order (e.g., in an order from top to bottom left to right in the target region or each consecutive sub-region) are cascaded to form the sequence of original logic values. In some implementations, the data block may further include administrative logic values, such as the first administrative logic value for indicating a correspondence between logical values comprised in the data block and image values of the image elements, and the second administrative logic value for indicating the type of the data block. When performing data extraction, the data extractor 120 may also determine the value of each bit based on the first administrative logic value, and/or may determine whether other logical values of the data block are for carrying data based on the second administrative logic value.

At block 830, the data extractor 120 determines the target data embedded into the target image based on the sequence of original logical values. In some implementations, data extractor 120 divides the sequence of original logical values into a plurality of packets. Each packet may have a predetermined number of original logical values and the division manner is the same as packet division manner at the time of data embedding. Each packet includes a header part and a payload part. The payload part carries a certain number (the third predetermined number) of logical values that correspond to the desired target data. As described above, the header part includes one or more logical values for indicating a header marker, an identification of the packet, and a check code of the payload. The header marker of the header part can help to determine how to divide the packet.

The identification of the packet in the header part of each packet may be used to determine the cascading order of logical values in the payload part. In some implementations, some packets may be embedded multiple times due to repeated embedding during the data embedding phase. In this case, the data extractor 120 determines whether there are duplicate packets based on the identification of the packet. If there are duplicate packets, the data extractor 120 may also determine a more accurate logical value by combining the logical values of the payload part of the repeated packets. Of course, if a packet in the repeated packets is less reliable, it can be discarded directly.

After the logical values of the payload parts of each packet are cascaded in order, a sequence of target logical values corresponding to the target data may be determined and the sequence may be converted into desired target data. In some implementations, the cascaded data may be further corrected via error correction or erasure correction coding. In some implementations, depending on the circumstances of the data extraction and subsequent processing experienced by the target image 122, the target data extracted by the data extractor 120 may be part or all of the target data embedded by the data embedder 110. In some implementations, the prefix part of the sequence of original logical values is used to indicate the length of the sequence of target logical values corresponding to the target data. The prefix part may be used to determine whether the determined sequence of target logical values is complete. In some implementations, to ensure the accuracy of the extracted data, the data extractor 120 may also perform a check on the logical values in the payload part based on the check code in the header part of each packet, and then the checked logical values are cascaded into a sequence of target logical values of the target data. The manner in which a check is performed on logical values depends on how the check code is generated. Any suitable check method may be used.

Example Implementations of Chart Image

Figure 9:
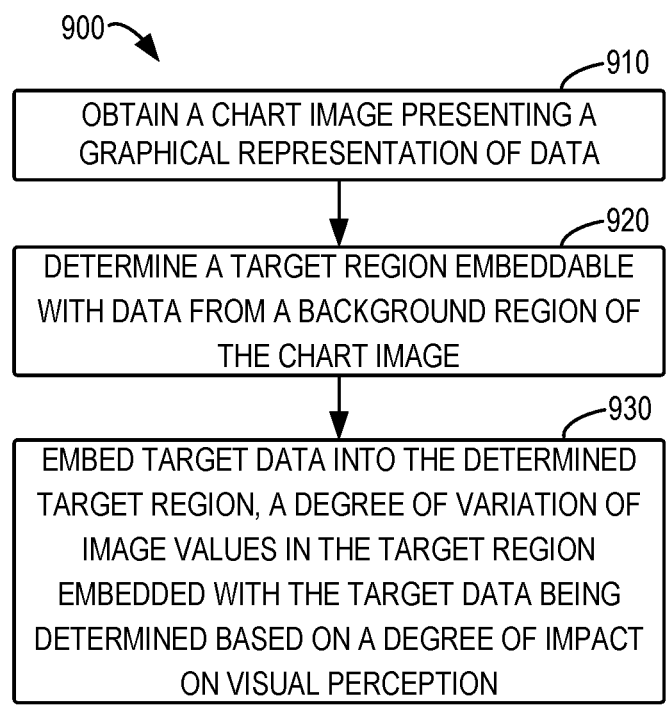
FIG. 9 shows a flowchart of a process for embedding data in an image in accordance with an implementation of the subject matter described herein.

FIG. 9 shows a flowchart of a process 900 for embedding data in an image in accordance with an implementation of the subject matter described herein. The process 900 is directed to a specific example of data embedding of a chart image. The process 900 can be implemented by a data embedder 110 of FIG. 1. For ease of discussion, the process 900 will be described with reference to FIG. 1.

At block 910, the data embedder 110 obtains a chart image of the graphical representation of the rendered data. At block 920, the data embedder 110 determines a target region embeddable with data from a background region of the chart image. The manner in which the target region is selected in the background region of the chart image can be referenced to one or more of the implementations discussed above. At block 930, the data embedder 110 embeds the target data in the determined target region, and the degree of variation of the image values in the target region after the target data is embedded is determined based on the degree of impact on the visual perception. The embedding of the target data can be determined by changing the image value of the image element in the target region. The degree of specific change in the image value is desirably controlled within a predetermined range, and may be determined based on the degree of impact on the visual perception of the chart image. The specific data embedding method can also refer to one or more of the implementations discussed above.

Example Device Implementation

Figure 10:
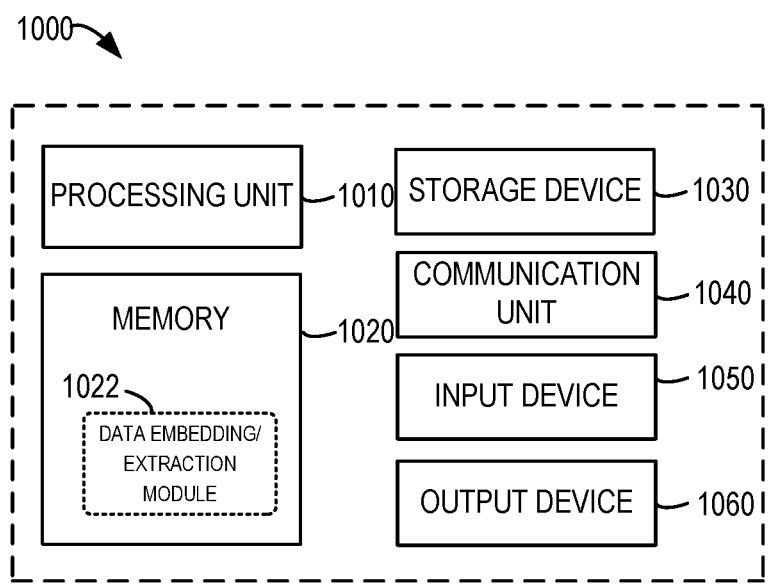
FIG. 10 illustrates a block diagram of a computing device in which various implementations of the subject matter described herein can be implemented.

FIG. 10 illustrates a block diagram of a computing device 1000 in which various implementations of the subject matter described herein can be implemented. It should be appreciated that the computing device 1000 shown in FIG. 1 is merely provided as an example, without suggesting any limitation to the functionalities and scope of implementations of the subject matter described herein. The computing device 1000 may be used to implement a data embedder 110 and/or a data extractor 120 in FIG. 1.

As shown in FIG. 10, the computing device 1000 includes a computing device 1000 in form of a general-purpose computing device. Components of the computing device 1000 may include, but are not limited to, one or more processors or processing units 1010, a memory 1020, a storage device 1030, one or more communication units 1040, one or more input devices 1050, and one or more output devices 1060.

In some implementations, the computing device 1000 may be implemented as various user terminals or server terminals. The service terminals may be any servers, large-scale computing devices, and the like provided by various service providers. The user terminals may be, for example, any type of mobile terminal, fixed terminal, or portable terminal, including a mobile phone, a station, a unit, a device, a multimedia computer, a multimedia tablet, an Internet node, a communicator, a desktop computer, a laptop computer, a notebook computer, a netbook computer, a tablet computer, a personal communication system (PCS) device, a personal navigation device, a personal digital assistant (PDA), an audio/video player, a digital camera/video camera, a positioning device, a TV receiver, a radio broadcast receiver, an E-book device, a gaming device or any combination thereof, including accessories and peripherals of these devices or any combination thereof. It should be appreciated that the computing device 1000 can support any type of interface for a user (such as "wearable" circuitry and the like).

The processing unit 1010 may be a physical or virtual processor and can implement various processes based on programs stored in the memory 1020. In a multi-processor system, a plurality of processing units executes computer-executable instructions in parallel so as to improve the parallel processing capability of the computing device 1000. The processing unit 1010 may also be referred to as a central processing unit (CPU), a microprocessor, a controller or a microcontroller.

The computing device 1000 usually includes various computer storage medium. Such computer storage medium may be any available medium accessible by the computing device 1000, including but not limited to, a volatile and non-volatile medium, or a detachable and non-detachable medium. The memory 1020 may be a volatile memory (e.g., a register, a cache, a random access memory (RAM)), a non-volatile memory (e.g., a read-only memory (ROM), an electrically erasable programmable read-only memory (EEPROM), a flash memory), or any combination thereof. The storage device 1030 may be a detachable or non-detachable medium and may include a machine-readable medium such as a memory, a flash drive, a magnetic disk or any other medium, which can be used for storing information and/or data and be accessed in the computing device 1000.

The computing device 100 may further include additional detachable/non-detachable, volatile/non-volatile memory medium. Although not shown in FIG. 10, it is possible to provide a disk drive for reading from or writing into a detachable and non-volatile disk and an optical disc drive for reading from and writing into a detachable non-volatile optical disc. In such cases, each drive may be connected to a bus (not shown) via one or more data medium interfaces.

The communication unit 1040 communicates with a further computing device via a communication medium. In addition, the functions of components in the computing device 1000 may be implemented by a single computing cluster or a plurality of computing machines that can communicate via communication connections. Therefore, the computing device 1000 can operate in a networked environment using a logical connection with one or more other servers, personal computers (PCs) or other general network nodes.

The input device 1050 may include one or more of various input devices, such as a mouse, a keyboard, a tracking ball, a voice-input device, and the like. The output device 1060 may include one or more of various output devices, such as a display, a loudspeaker, a printer, and the like. By means of the communication unit 1040, the computing device 1000 may further communicate with one or more external devices (not shown) such as the storage devices and display devices, with one or more devices enabling a user to interact with the computing device 1000, or with any devices (such as a network card, a modem, and the like) enabling the computing device 1000 to communicate with one or more other computing devices, if required. Such communication may be performed via input/output (I/O) interfaces (not shown).

In some implementations, as an alternative of being integrated on a single device, some or all components of the computing device 1000 may also be arranged in the form of a cloud computing architecture. In the cloud computing architecture, the components may be provided remotely and work together to implement the functions described in the subject matter described herein. In some implementations, cloud computing provides computing, software, data access and storage services, which will not require end users to be aware of the physical locations or configurations of the systems or hardware providing these services. In various implementations, the cloud computing provides the services via a wide area network (such as Internet) using proper protocols. For example, a cloud computing provider provides applications over the wide region network, which can be accessed through a web browser or any other computing components. The software or components of the cloud computing architecture and corresponding data may be stored on a server at a remote location. The computing resources in the cloud computing environment may be merged at locations of remote data centers or may be distributed. Cloud computing infrastructures may provide the services through a shared data center, though they behave as a single access point for users. Therefore, the cloud computing architecture may be used to provide the components and functions described herein from a service provider at a remote location. Alternatively, they may be provided from a conventional server or installed directly or otherwise on a client device.

The computing device 1000 may be used to implement data embedding and data extraction in an image according to various implementations of the subject matter described herein. The memory 1020 may include one or more modules having one or more program instructions. These modules can be accessed and executed by the processing unit 1010 to perform functions of various implementations described herein. For example, the memory 1020 may include a data embedding/extraction module 1022. The data embedding/extraction module 1022 may be configured to implement the data embedding and/or data extraction functions described in one or more implementations herein.

Example Implementations

Some example implementations of the subject matter described herein are listed below.

In one aspect, the subject matter described herein provides a computer-implemented method, comprising: determining, from a source image, a target region embeddable with data, the source image comprising a plurality of image elements arranged in rows and columns, and the target region comprising one or more flat or textured areas in the source image; converting target data into a sequence of logical values represented in a predetermined format; and generating a target image embedded with the target data by changing an image value of at least one of the image elements of the target region within a predetermined range based on the sequence of logical values, different image values of the image elements in the target region indicating different logical values in the predetermined format, respectively.

In some implementations, generating the target image embedded with the target data comprises: packaging the sequence of logical values into a plurality of data blocks in a predetermined order, each data block comprising a first predetermined number of logical values placed in rows and columns; and embedding the plurality of data blocks into the target region, logical values in each data block being indicated by image values of a second predetermined number of image elements in the target region.

In some implementations, packaging the sequence of logical values into the plurality of data blocks comprises: adding a prefix part to the sequence of logical values, the prefix part comprising at least one logical value represented in the predetermined format to indicate a length of the sequence of logical values; and packaging the prefix part and the sequence of logical values into the plurality of data blocks.

In some implementations, packaging the sequence of logical values into the plurality of data blocks comprises: dividing at least the sequence of logical values into a plurality of packets, each packet comprising a header part and a payload part, the payload part comprising a third predetermined number of logical values in the sequence of logical values, and the header part comprising at least one logical value represented in the predetermined format to indicate at least one of: a header marker, an identification of the packet, and a check code of the payload part; and packaging logical values comprised in the plurality of packets into the plurality of data blocks.

In some implementations, at least one of the plurality of data blocks further comprises at least one of: a first administrative logic value indicating a correspondence between the logical values comprised in the at least one data block and the image values of the image elements, and a second administrative logic value indicating a type of the at least one data block.

In some implementations, the target region comprises a sub-region consisting of a plurality of consecutive image elements, and embedding the plurality of data blocks into the target region comprises: embedding a start mark block in the sub-region, the start mark block comprising a plurality of logical values arranged in rows and columns to indicate a start of data embedding in the sub-region; and embedding at least one of the plurality of data blocks following the start mark block.

In some implementations, embedding the plurality of data blocks into the target region further comprises: embedding an end mark block following the at least one data block in the sub-region, the end mark block comprising a plurality of logical values arranged in rows and columns to indicate an end of the data embedding in the sub-region.

In some implementations, the start mark block and the end mark block are the same.

In some implementations, the method further comprises: embedding at least one first synchronization alignment block in the target region, each first synchronization alignment block having a first predetermined pattern which is defined by changing image values of the image elements covered by the first synchronization alignment block within the predetermined range.

In some implementations, the method further comprises: embedding a plurality of second synchronization alignment blocks in the target region, each second synchronization alignment block having a second predetermined pattern which is defined by changing image values of the image elements covered by the second synchronization alignment block within the predetermined range, and a distance between each two adjacent ones of the plurality of second embedded synchronization alignment blocks in a row direction or a column direction being selected from a set of predetermined distances.

In some implementations, determining the target region comprises: dividing the source image into a foreground region and a background region; and selecting the target region from the background region.

In some implementations, selecting the target region from the background region comprises: selecting the target region from the background region such that a transition region is present between an edge of the selected target region and an edge of the foreground region, wherein the method further comprises: performing smoothing from the target region to the foreground region on the transition region.

In some implementations, the method further comprises: processing at least one visual element presented in the foreground region to enhance visibility of the at least one visual element in the target image.

In some implementations, the source image comprises an image presenting a graphical representation of data.

In a second aspect, the subject matter described herein provides a computer-implemented method. The method comprises: determining, from a target image, a target region for data extraction, the target image comprising a plurality of image elements arranged in rows and columns, and the target region comprising one or more flat or textured areas in the target image; determining a sequence of original logical values represented in a predetermined format based on image values of the image elements in the target region, different image values of the image elements in the target region indicating different logical values in the predetermined format, respectively; and determining target data embedded in the target image based on the sequence of original logical values.

In some implementations, determining the sequence of original logical values comprises: determining a plurality of data blocks embedded in the target region by analyzing the image values of the image elements in the target region row by row or column by column, each data block comprising a first predetermined number of logical values placed in rows and columns; and cascading the logical values comprised in the plurality of data blocks in a predetermined order to determine the sequence of original logical values.

In some implementations, determining target data based on the sequence of original logical values: dividing the sequence of original logical values into a plurality of packets, determining a header part and a payload part of a corresponding packet in the plurality of packets, the payload part of each packet comprising a third predetermined number of logical values in the sequence of logical values, and the header part of each packet comprising at least one logical value represented in the predetermined format to at least indicate an identification of the packet; cascading a logical value in a payload part of the plurality of packets based on the identification of the plurality of packets to obtain a sequence of target logical values corresponding to the target data; and converting the target sequence of logical values into the target data.

In some implementations, the header part of each packet further comprises at least one logical value represented in a predetermined format for indicating a check code of the payload part of the packet, and cascading the logical value in the payload part of the plurality of packets further comprises: performing a check on a logical value in a payload part of the plurality of packets based on the check code comprised in a header part of the packet; and cascading the checked logical value into a sequence of target logical values.

In some implementations, at least one of the plurality of data blocks further comprises at least one of: a first administrative logic value indicating a correspondence between the logical values comprised in the at least one data block and the image values of the image elements, and a second administrative logic value indicating a type of the at least one data block.

In some implementations, the target region comprises a sub-region consisting of a plurality of consecutive image elements, and determining the plurality of data blocks embedded in the target region comprises: detecting a start mark block from the sub-region based on a predetermined combination of a plurality of logical values for indicating a start of data embedding in the sub-region; and in response to detecting the start mark block, determining at least one of the plurality of data blocks following the start mark block in the sub-region.

In some implementations, determining the plurality of data blocks embedded in the target region further comprises: detecting a start mark block from the sub-region based on a predetermined combination of a plurality of logical values for indicating a start of data embedding in the sub-region; and in response to detecting the start mark block, determining at least one of the plurality of data blocks following the start mark block in the sub-region.

In some implementations, the start mark block and the end mark block are the same.

In some implementations, determining the target region comprises: determining a first candidate synchronization alignment block from the target image based on a first predetermined pattern, the first candidate synchronization alignment block having a first candidate pattern matching a structural feature of the first predetermined pattern; determining a deformation parameter with which the first candidate pattern is deformed to the first predetermined pattern; performing a deformation operation on the target image based on the deformation parameter, to obtain a deformed target image; and determining the target region from the deformed target image.

In some implementations, determining the target region from the deformed target image comprises: determining a plurality of second candidate synchronization alignment blocks from the target image based on a second predetermined pattern, the plurality of second candidate synchronization alignment blocks having a second candidate pattern matching a structural feature of the second predetermined pattern; determining a scaling parameter for the deformed target image based on a candidate distance of each two adjacent ones of the plurality of second candidate synchronization alignment blocks in a row direction or a column direction and a set of predetermined distances; scaling the deformed target image based on the scaling parameter; and determining the target region from the deformed scaled target image.

In some implementations, determining the target region comprises: dividing the target image into a foreground region and a background region; and selecting the target region from the background region.

In some implementations, determining the target region from the background region comprises: determining the target region from the background region such that a transition region with a predetermined size is present between an edge of the selected target region and an edge of the foreground region.

In a third aspect, the subject matter described herein provides a computer-implemented method. The method comprising: obtaining a chart image presenting a graphical representation of data; determining a target region embeddable with data from a background region of the chart image; and embedding target data into the determined target region, a degree of variation of image values in the target region embedded with the target data being determined based on a degree of impact on visual perception.

In a fourth aspect, the subject matter described herein provides an electronic device. The electronic device comprises a processing unit; and a memory coupled to the processing unit and having instructions stored thereon which, when executed by the processing unit, cause the device to perform acts comprising: determining, from a source image, a target region embeddable with data, the source image comprising a plurality of image elements arranged in rows and columns, and the target region comprising one or more flat or textured areas in the source image; converting target data into a sequence of logical values represented in a predetermined format; and generating a target image embedded with the target data by changing an image value of at least one of the image elements of the target region within a predetermined range based on the sequence of logical values, different image values of the image elements in the target region indicating different logical values in the predetermined format, respectively.

In some implementations, generating the target image embedded with the target data comprises: packaging the sequence of logical values into a plurality of data blocks in a predetermined order, each data block comprising a first predetermined number of logical values placed in rows and columns; and embedding the plurality of data blocks into the target region, logical values in each data block being indicated by image values of a second predetermined number of image elements in the target region.

In some implementations, packaging the sequence of logical values into the plurality of data blocks comprises: adding a prefix part to the sequence of logical values, the prefix part comprising at least one logical value represented in the predetermined format to indicate a length of the sequence of logical values; and packaging the prefix part and the sequence of logical values into the plurality of data blocks.

In some implementations, packaging the sequence of logical values into the plurality of data blocks comprises: dividing at least the sequence of logical values into a plurality of packets, each packet comprising a header part and a payload part, the payload part comprising a third predetermined number of logical values in the sequence of logical values, and the header part comprising at least one logical value represented in the predetermined format to indicate at least one of: a header marker, an identification of the packet, and a check code of the payload part; and packaging logical values comprised in the plurality of packets into the plurality of data blocks.

In some implementations, at least one of the plurality of data blocks further comprises at least one of: a first administrative logic value indicating a correspondence between the logical values comprised in the at least one data block and the image values of the image elements, and a second administrative logic value indicating a type of the at least one data block.

In some implementations, the target region comprises a sub-region consisting of a plurality of consecutive image elements, and embedding the plurality of data blocks into the target region comprises: embedding a start mark block in the sub-region, the start mark block comprising a plurality of logical values arranged in rows and columns to indicate a start of data embedding in the sub-region; and embedding at least one of the plurality of data blocks following the start mark block.

In some implementations, embedding the plurality of data blocks into the target region further comprises: embedding an end mark block following the at least one data block in the sub-region, the end mark block comprising a plurality of logical values arranged in rows and columns to indicate an end of the data embedding in the sub-region.

In some implementations, the start mark block and the end mark block are the same.

In some implementations, the acts further comprise: embedding at least one first synchronization alignment block in the target region, each first synchronization alignment block having a first predetermined pattern which is defined by changing image values of the image elements covered by the first synchronization alignment block within the predetermined range.

In some implementations, the acts further comprise: embedding a plurality of second synchronization alignment blocks in the target region, each second synchronization alignment block having a second predetermined pattern which is defined by changing image values of the image elements covered by the second synchronization alignment block within the predetermined range, and a distance between each two adjacent ones of the plurality of second embedded synchronization alignment blocks in a row direction or a column direction being selected from a set of predetermined distances.

In some implementations, determining the target region comprises: dividing the source image into a foreground region and a background region; and selecting the target region from the background region.

In some implementations, selecting the target region from the background region comprises: selecting the target region from the background region such that a transition region is present between an edge of the selected target region and an edge of the foreground region, wherein the method further comprises: performing smoothing from the target region to the foreground region on the transition region.

In some implementations, the acts further comprise: processing at least one visual element presented in the foreground region to enhance visibility of the at least one visual element in the target image.

In some implementations, the source image comprises an image presenting a graphical representation of data.

In a fifth aspect, the subject matter described herein provides an electronic device. The electronic device comprises: a processing unit; and a memory coupled to the processing unit and having instructions stored thereon which, when executed by the processing unit, cause the device to perform acts comprising: determining, from a target image, a target region for data extraction, the target image comprising a plurality of image elements arranged in rows and columns, and the target region comprising one or more flat or textured areas in the target image; determining a sequence of original logical values represented in a predetermined format based on image values of the image elements in the target region, different image values of the image elements in the target region indicating different logical values in the predetermined format, respectively; and determining target data embedded in the target image based on the sequence of original logical values.

In some implementations, determining the sequence of original logical values comprises: determining a plurality of data blocks embedded in the target region by analyzing the image values of the image elements in the target region row by row or column by column, each data block comprising a first predetermined number of logical values placed in rows and columns; and cascading the logical values comprised in the plurality of data blocks in a predetermined order to determine the sequence of original logical values.

In some implementations, determining target data based on the sequence of original logical values: dividing the sequence of original logical values into a plurality of packets, determining a header part and a payload part of a corresponding packet in the plurality of packets, the payload part of each packet comprising a third predetermined number of logical values in the sequence of logical values, and the header part of each packet comprising at least one logical value represented in the predetermined format to at least indicate an identification of the packet: cascading a logical value in a payload part of the plurality of packets based on the identification of the plurality of packets to obtain a sequence of target logical values corresponding to the target data; and converting the target sequence of logical values into the target data.

In some implementations, the header part of each packet further comprises at least one logical value represented in a predetermined format for indicating a check code of the payload part of the packet, and cascading the logical values in the payload part of the plurality of packets further comprises: performing a check on a logical value in a payload part of the plurality of packets based on a check code comprised in a header part of the packet; and cascading the checked logical values into a sequence of target logical values.

In some implementations, at least one of the plurality of data blocks further comprises at least one of: a first administrative logic value indicating a correspondence between the logical values comprised in the at least one data block and the image values of the image elements, and a second administrative logic value indicating a type of the at least one data block.

In some implementations, the target region comprises a sub-region consisting of a plurality of consecutive image elements, and determining the plurality of data blocks embedded in the target region comprises: detecting a start mark block from the sub-region based on a predetermined combination of a plurality of logical values for indicating a start of data embedding in the sub-region; and in response to detecting the start mark block, determining at least one of the plurality of data blocks following the start mark block in the sub-region.

In some implementations, determining the plurality of data blocks embedded in the target region further comprises: detecting a start mark block from the sub-region based on a predetermined combination of a plurality of logical values for indicating a start of data embedding in the sub-region; and in response to detecting the start mark block, determining at least one of the plurality of data blocks following the start mark block in the sub-region.

In some implementations, the start mark block and the end mark block are the same.

In some implementations, determining the target region comprises: determining a first candidate synchronization alignment block from the target image based on a first predetermined pattern, the first candidate synchronization alignment block having a first candidate pattern matching a structural feature of the first predetermined pattern; determining a deformation parameter with which the first candidate pattern is deformed to the first predetermined pattern; performing a deformation operation on the target image based on the deformation parameter to obtain a deformed target image; and determining the target region from the deformed target image.

In some implementations, determining the target region from the deformed target image comprises: determining a plurality of second candidate synchronization alignment blocks from the target image based on a second predetermined pattern, the plurality of second candidate synchronization alignment blocks having a second candidate pattern matching a structural feature of the second predetermined pattern; determining a scaling parameter for the deformed target image based on a candidate distance of each two adjacent ones of the plurality of second candidate synchronization alignment blocks in a row direction or a column direction and a set of predetermined distances; scaling the deformed target image based on the scaling parameter; and determining the target region from the deformed scaled target image.

In some implementations, determining the target region comprising: dividing the source image into a foreground region and a background region; and selecting the target region from the background region.

In some implementations, determining the target region from the background region comprises: determining the target region from the background region such that a transition region with a predetermined size is present between an edge of the selected target region and an edge of the foreground region.

In a sixth aspect, the subject matter described herein provides an electronic device. The electronic device comprises a processing unit; and a memory coupled to the processing unit and having instructions stored thereon which, when executed by the processing unit, cause the device to perform acts comprising: obtaining a chart image presenting a graphical representation of data; determining a target region embeddable with data from a background region of the chart image; and embedding target data into the determined target region, a degree of variation of image values in the target region embedded with the target data being determined based on a degree of impact on visual perception.

In a seventh aspect, the subject matter described herein provides a computer program product being tangibly stored on a non-transitory computer storage medium and comprising machine-executable instructions which, when executed by a device, cause the device to perform the method of the first, second and third aspect.

In an eighth aspect, the subject matter described herein provides a computer-readable medium having machine-executable instructions stored thereon which, when executed by a device, cause the device to perform the method according to the above aspect.

The functionalities described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and the like.

Program code for carrying out the methods of the subject matter described herein may be written in any combination of one or more programming languages. The program code may be provided to a processor or controller of a general-purpose computer, a special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or a server.

In the context of this subject matter described herein, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
    determining, from a source image, a target region embeddable with data, the source image comprising a plurality of image elements arranged in rows and columns, and the target region comprising:
        one or more flat or textured areas in the source image; and
        a sub-region having a plurality of consecutive image elements;
    converting target data into a sequence of logical values represented in a predetermined format;
    packaging the sequence of logical values into a plurality of data blocks in a predetermined order, each data block comprising a first predetermined number of logical values placed in rows and columns;
    embedding a start mark block in the sub-region, the start mark block comprising a plurality of logical values arranged in rows and columns to indicate a start of data embedding in the sub-region;
    embedding at least one data block of the plurality of data blocks following the start mark block;
    embedding an end mark block following the at least one data block in the sub-region, the end mark block comprising a plurality of logical values arranged in rows and columns to indicate an end of the data embedding in the sub-region; and
    generating a target image with the embedded sub-region by changing an image value of at least one of the image elements of the target region within a predetermined range based on the sequence of logical values where different image values of the image elements in the target region respectively indicate different logical values in the predetermined format.

2. The method of claim 1, wherein packaging the sequence of logical values into the plurality of data blocks comprises:
    adding a prefix part to the sequence of logical values, the prefix part comprising at least one logical value represented in the predetermined format to indicate a length of the sequence of logical values; and
    packaging the prefix part and the sequence of logical values into the plurality of data blocks.

3. The method of claim 1, wherein packaging the sequence of logical values into the plurality of data blocks comprises:
    dividing at least the sequence of logical values into a plurality of packets, each packet comprising a header part and a payload part, the payload part comprising a third predetermined number of logical values in the sequence of logical values, and the header part comprising at least one logical value represented in the predetermined format to indicate at least one of: a header marker, an identification of the packet, and a check code of the payload part; and
    packaging logical values comprised in the plurality of packets into the plurality of data blocks.

4. The method of claim 1, wherein at least one of the plurality of data blocks further comprises at least one of:
    a first administrative logic value indicating a correspondence between the logical values comprised in the at least one data block and the image values of the image elements, and
    a second administrative logic value indicating a type of the at least one data block.

5. The method of claim 1, wherein determining the target region comprises:
    dividing the source image into a foreground region and a background region; and
    selecting the target region from the background region.

6. The method of claim 1, further comprising embedding at least one first synchronization alignment block in the target region, each first synchronization alignment block having a first predetermined pattern which is defined by changing image values of the image elements covered by the first synchronization alignment block within the predetermined range.

7. The method of claim 1, further comprising embedding a plurality of second synchronization alignment blocks in the target region, each second synchronization alignment block having a second predetermined pattern which is defined by changing image values of the image elements covered by the second synchronization alignment block within the predetermined range, and a distance between each two adjacent ones of the plurality of second embedded synchronization alignment blocks in a row direction or a column direction being selected from a set of predetermined distances.

8. The method of claim 1, wherein the source image is a chart image.

9. An electronic device comprising:
    a processing unit; and
    a memory coupled to the processing unit and comprising instructions stored thereon which, when executed by the processing unit, cause the device to perform the method according to claim 1.

10. A computer implemented method comprising:
  determining, from a target image, a target region for data extraction, the target image comprising a plurality of image elements arranged in rows and columns, and the target region comprising:
    one or more flat or textured areas in the target image; and
    a sub-region having a plurality of consecutive image elements;
  determining a sequence of original logical values represented in a predetermined format based on image values of the image elements in the target region, different image values of the image elements in the target region indicating different logical values in the predetermined format, respectively;
  packaging the sequence of logical values into a plurality of data blocks in a predetermined order, each data block comprising a first predetermined number of logical values placed in rows and columns;
  embedding a start mark block in the sub-region, the start mark block comprising a plurality of logical values arranged in rows and columns to indicate a start of data embedding in the sub-region;
  embedding at least one data block of the plurality of data blocks following the start mark block;
  embedding an end mark block following the at least one data block in the sub-region, the end mark block comprising a plurality of logical values arranged in rows and columns to indicate an end of the data embedding in the sub-region; and
  determining target data embedded in the target image based on the sequence of original logical values.

11. The method of claim 10, the method further comprising cascading the logical values comprised in the plurality of data blocks in a predetermined order to determine the sequence of original logical values.

12. The method of claim 11, wherein determining the plurality of data blocks embedded in the target region comprises:
  detecting the start mark block; and
  in response to detecting the start mark block, determining at least one of the plurality of data blocks following the start mark block in the sub-region.

* * * * *